US012158547B2

(12) United States Patent
Morelli et al.

(10) Patent No.: US 12,158,547 B2
(45) Date of Patent: Dec. 3, 2024

(54) METHOD FOR CHARACTERIZING LIDAR POINT CLOUD QUALITY

(71) Applicant: LG INNOTEK CO., LTD., Seoul (KR)

(72) Inventors: Michael V. Morelli, San Jose, CA (US); Laurens M. Schouten-Evers, San Francisco, CA (US)

(73) Assignee: LG INNOTEK CO., LTD., Seoul (KR)

( * ) Notice: Subject to any disclaimer, the term of this patent is extended or adjusted under 35 U.S.C. 154(b) by 961 days.

(21) Appl. No.: 17/179,031

(22) Filed: Feb. 18, 2021

(65) Prior Publication Data

US 2022/0260692 A1    Aug. 18, 2022

(51) Int. Cl.
   *G01S 7/497*    (2006.01)
   *G01S 17/89*    (2020.01)
   (Continued)

(52) U.S. Cl.
   CPC .............. *G01S 7/497* (2013.01); *G01S 17/89* (2013.01); *G01S 17/931* (2020.01);
   (Continued)

(58) Field of Classification Search
   CPC ....... G01S 7/497; G01S 17/89; G06T 7/0002; G06T 7/80; G06T 2207/10028; G06T 2207/30168
   See application file for complete search history.

(56) References Cited

U.S. PATENT DOCUMENTS 7,411,681 B2    8/2008  Retterath et al.
8,358,810 B2    1/2013  Roberts et al.
(Continued)

FOREIGN PATENT DOCUMENTS

WO    2019130234 A1    7/2019

OTHER PUBLICATIONS

Davis et al. "Reflective Fiducials for Localization With 3D Light Detection and Ranging Scanners", IEEE Access, Apr. 9, 2019, pp. 45291-45300, vol. 7, IEEE, New York, NY.
(Continued)

*Primary Examiner* — Yuqing Xiao
*Assistant Examiner* — Zhengqing Qi
(74) *Attorney, Agent, or Firm* — Birch, Stewart, Kolasch & Birch, LLP

(57) ABSTRACT

Systems, methods, and computer-readable media are disclosed for characterizing LIDAR point cloud quality. An example method may involve capturing a first point cloud for a test target including a retroreflective object, the first point cloud including a first region. The example method may also involve capturing, by a LIDAR system, a second point cloud for the test target. The example method may also involve applying a penalty function to a first point in the second point cloud, wherein the first point is within an acceptable error threshold based on the first region. The example method may also involve applying a penalty function to a second point in the second point cloud, wherein the second point is outside of the acceptable error threshold based on the first region. The example method may also involve generating a first score for the first point and a second score for the second point based on the penalty function. The example method may also involve combining the first score and the second score to produce a point cloud quality metric for the second point cloud. The example method may also involve calibrating, based on the point cloud quality metric, the LIDAR system for the retroreflective object.

20 Claims, 12 Drawing Sheets

(51) Int. Cl.
  *G01S 17/931*  (2020.01)
  *G06T 7/00*  (2017.01)
  *G06T 7/80*  (2017.01)

(52) U.S. Cl.
  CPC .............. *G06T 7/0002* (2013.01); *G06T 7/80* (2017.01); *G06T 2207/10028* (2013.01); *G06T 2207/30168* (2013.01)

(56) References Cited

U.S. PATENT DOCUMENTS

| | | | |
|---|---|---|---|
| 8,699,755 | B2 | 4/2014 | Stroila et al. |
| 9,043,069 | B1* | 5/2015 | Ferguson ................ G06T 7/215 |
| | | | 701/23 |
| 9,221,461 | B2 | 12/2015 | Ferguson et al. |
| 9,489,601 | B2 | 11/2016 | Fairfield et al. |
| 9,513,130 | B1* | 12/2016 | Boggs ................ G01C 21/1652 |
| 2002/0145607 | A1 | 10/2002 | Dimsdale |
| 2009/0185741 | A1 | 7/2009 | Nahari et al. |
| 2010/0217529 | A1 | 8/2010 | Stroila et al. |
| 2014/0240690 | A1* | 8/2014 | Newman ............... G01S 7/4972 |
| | | | 356/4.01 |
| 2017/0046840 | A1* | 2/2017 | Chen ..................... G01C 21/36 |
| 2019/0293770 | A1 | 9/2019 | Subasingha et al. |
| 2020/0041649 | A1 | 2/2020 | Green et al. |
| 2020/0234491 | A1* | 7/2020 | Pöyhtäri ................. G06T 17/00 |
| 2020/0273193 | A1* | 8/2020 | Anderberg ............... G06T 5/50 |

OTHER PUBLICATIONS

Wei et al. "LiDAR and Camera Detection Fusion in a Real-Time Industrial Multi-Sensor Collision Avoidance System", Electronics, May 30, 2018, pp. 1-34, vol. 7, issue 0, MDPI, Basel, Switzerland.
Wilkinson et al. "Geometric targets for UAS Lidar", Remote Sensing, Dec. 14, 2019, pp. 1-20, vol. 11, MDPI, Basel, Switzerland.
Li et al. "Towards Uniform Point Density: Evaluation of an Adaptive Terrestrial Laser Scanner", Remote Sensing, Apr. 11, 2019, pp. 1-16, vol. 11, MDPI, Basel, Switzerland.
International Search Report and Written Opinion for International Application No. PCT/US2022/016538, Korean Intellectual Property Office, Daejeon, Republic of Korea, dated May 30, 2022, 8 pages.

* cited by examiner

METHOD FOR CHARACTERIZING LIDAR POINT CLOUD QUALITY

BACKGROUND

Light Detection and Ranging (LIDAR) systems may be used to ascertain information about objects in an environment external to the LIDAR system by emitting light pulses into the environment. When a return light pulse is detected at the LIDAR system, the LIDAR system may be able to determine that an object exists in the environment in the direction that the light pulse was emitted. Additionally, the LIDAR system may be able to determine a distance the object is from the LIDAR system based on the amount of time between the light pulse being emitted and the return light pulse being detected (for example, the "Time of Flight" (ToF) of the light pulse). This detected return light pulse may be saved as one point. The LIDAR system may be constantly emitting and detecting light pulses, and a number of such points may correspondingly be created. A collection of such points may be referred to as a "point cloud," and such point clouds may be analyzed to determine information about the object in the environment. For example, a cluster of points in the point cloud may be associated with a particular object and may provide an indication of a size and/or a shape of one or more objects in the environment. In some cases, the creation and analysis of the point cloud may be carried out by a system in which the LIDAR is incorporated. For example, if the LIDAR system may be incorporated into an autonomous vehicle, the point clouds may be used to assist the vehicle in detecting objects in the environment so that the vehicle may navigate the environment. However, in some instances, there may be a certain amount of error associated one or more of the points in the point cloud.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
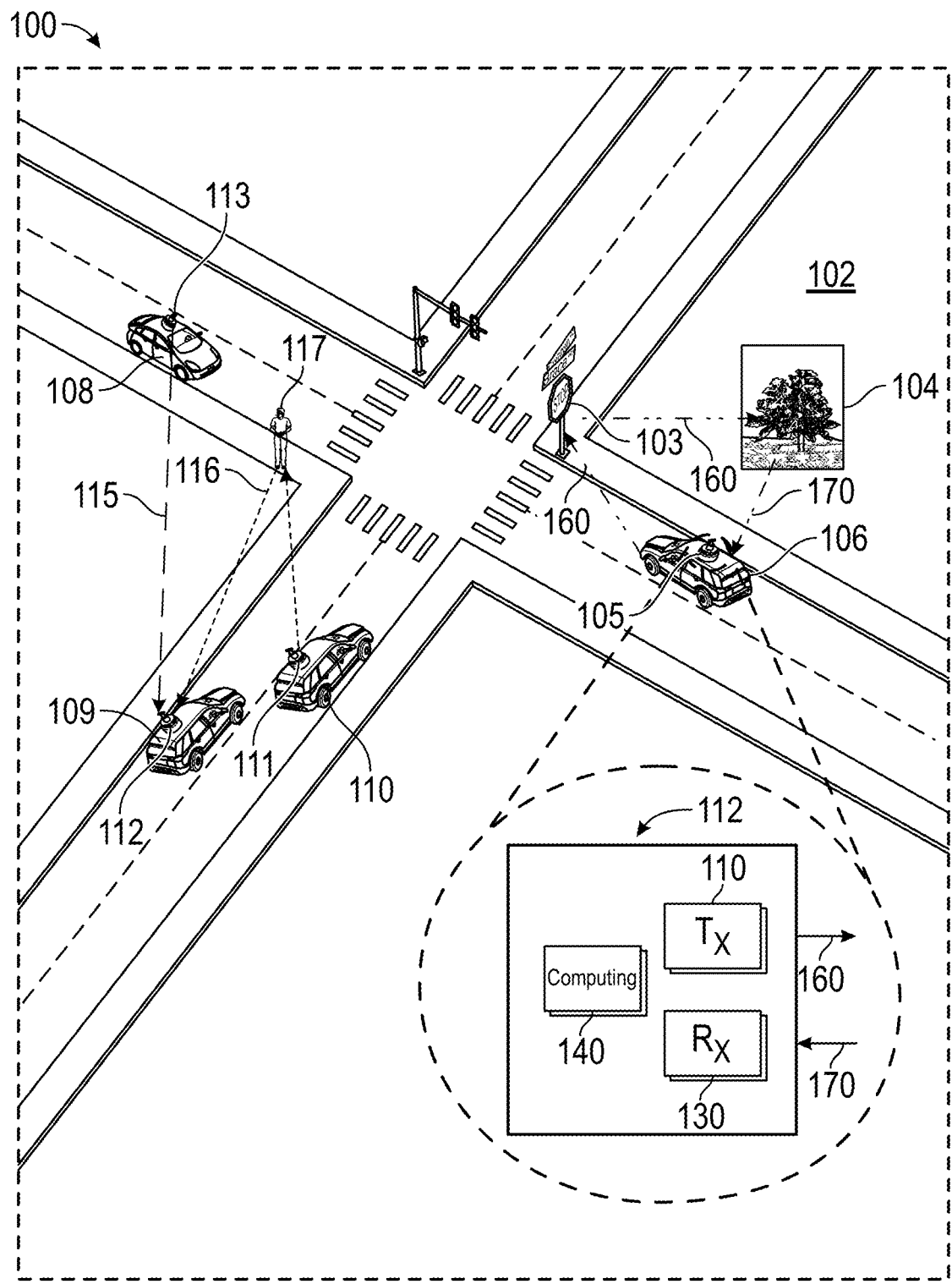
FIG. 1 depicts a schematic illustration of an example system, in accordance with one or more example embodiments of the disclosure.

This disclosure relates to, among other things, systems and methods for characterizing LIDAR point cloud quality. More particularly, the systems and methods described herein may be used to establish a point cloud quality metric that may be used to quantify the impact that an "aggressor object" (which may be defined in more detail below) may have on the ability of a particular LIDAR system to generate accurate point clouds representing the object. This metric may also be used to compare the ability of different LIDAR systems to generate point clouds for the same aggressor object or the ability of one particular LIDAR system to generate point clouds for different types of aggressor objects. This metric may further be used for any number of purposes, such as for performing calibration of the LIDAR systems to allow the LIDAR systems to generate higher quality point clouds (or perform post-processing of point cloud data to account for lower quality point clouds) for the given aggressor object, or simply providing data pertaining to how the particular LIDAR systems will function when they encounter the aggressor object in a real-world environment.

Light Detection and Ranging (LIDAR) systems (the terms "LIDAR" and "LIDAR system" may be used interchangeably herein) may be used to ascertain information about objects in an environment external to the LIDAR system by emitting light pulses into the environment. When a return light pulse is detected at the LIDAR system, the LIDAR system may be able to determine that an object exists in the environment in the direction that the light pulse was emitted. Additionally, the LIDAR system may be able to determine a distance the object is from the LIDAR system based on the amount of time between the light pulse being emitted and the return light pulse being detected (for example, the "Time of Flight" (ToF) of the light pulse). A detected return light pulse may be saved as a point. The point may be a single point that serves as a digital representation of a location from which the return light was reflected back to the LIDAR system (for example, based on the determined ToF of that particular light pulse). The LIDAR system may continuously emit and detect light pulses, which may result in a large number of such points being generated by the LIDAR system. A collection of such points may be referred to as a "point cloud," and such point clouds may provide information about the object in the environment (examples of point clouds may be found in FIGS. 5B-6D). For example, the point clouds may provide an indication of a size and/or a shape of one or more objects in the environment. That is, an ideal point cloud (a high quality point cloud) may be a collection of points that may be in the shape and/or size of the object from which the light pulses are being reflected. For example, if the LIDAR system is emitting light pulses towards a tree in the environment, then an ideal point cloud may be a collection of points that as a whole form the shape of the tree. In some cases, the creation and analysis of the point cloud may be carried out by a system in which the LIDAR is incorporated. For example, the LIDAR system may be incorporated into an autonomous vehicle, in which case the point clouds generated by the LIDAR system may be used to assist the vehicle in detecting objects in the environment so that the vehicle may autonomously navigate the environment (or perform other autonomous or semi-autonomous functionalities).

In some cases, however, there may be a certain amount of error associated with the point clouds generated by the LIDAR systems. As one example, such error may be the result of "aggressor objects" that may exist in the environment. An aggressor object may refer to any object that may cause the LIDAR system to detect inaccurate ToF information for emitted light pulses. With a non-aggressor object, the LIDAR may emit a light pulse, the light pulse may be reflected from the non-aggressor object, the LIDAR may then receive the return light reflected from the object. In such cases, the ToF of the light pulse may be used to effectively determine the distance from the LIDAR to the non-aggressor object (and a valid point may be generated for that particular detected light pulse). This process may be repeated until numerous points are created to form a point cloud representative of the particular non-aggressor object as described above. However, with aggressor objects, return light pulses that are detected by the LIDAR may not necessarily represent a ToF indicative of the actual distance the object is located from the LIDAR. This may be problematic because even range errors as small as 10-20 cm and/or an angular errors as small as tenths of a degree may be sufficient to impact the validity of the point cloud generated for an object.

These aggressor objects as described above may include any number of different types of objects that may exist in an environment. As a first example, an aggressor object may include a retroreflective surface, such as a retroreflective sign or retroreflective license plate. As a second example, an aggressor object may also include a specular object. A specular object may reflect a large percentage of light that it receives. A retroreflective object may differ from a specular object in that a retroreflective object may always appear highly reflective, regardless of its orientation relative to a light source, whereas a specular object may only appear highly reflective when observed at a normal angle to a surface of the specular object. As one non-limiting example, an example of a specular object may include a mirror. The mirror may only reflect a large amount of light when light is being provided to the flat surface of the mirror, and the same amount of reflection may not occur when light is being provided to the mirror at angles other than normal to the flat surface. In contrast, a retroreflective object may reflect a large amount of light regardless of the angle at which the light is provided to the retroreflective object. The retroreflective object and the specular objects may be distinguished using a bidirectional reflectance function. The specular objects may result in a large amount of point cloud error because an emitted LIDAR pulse may be more likely to reflect from the specular object and towards another object before being reflected back to the LIDAR system. Consequentially, the amount of time it may take for the emitted light pulse to return to the LIDAR system may be increased, which may cause the LIDAR system to falsely determine that the specular object is farther away from the LIDAR system than it actually is. Consequentially, one or more points associated with the specular object on the point cloud may indicate that the specular object is further away from the LIDAR than it actually is. The specular object may still reflect some of the emitted light pulses directly back towards the LIDAR. Thus, there may be some points on the point cloud that may accurately represent the distance of the object to the LIDAR. However, because some of the light pulses may be reflected towards other objects before returning to the LIDAR, there may be multiple clusters of points in the point cloud associated with the specular object.

In addition to retroreflective or specular objects, a third example of an aggressor object may include an active object. An active object may refer to an object that may actively be sending light pulses towards the LIDAR. This may contrast with a passive object, such as a street sign, for example, that may simply reflect emitted light pulses back towards the LIDAR. One example of an active object may include a second LIDAR system that may exist in the environment of the LIDAR system (which for clarify purposes may be referred to as the "first LIDAR system" in this example). For example, there may be multiple vehicles traversing the environment, and some or all of the vehicles may include their own individual LIDAR systems. The other active objects in the environment may result in point cloud error because the other LIDAR systems may emit light pulses that may be detected by the first LIDAR system. If both of these vehicles are using their respective LIDAR systems to emit light pulses into the environment, then the first LIDAR may not be able to differentiate between return light pulses that originate from its own emitted light pulses or that originate from light pulses emitted by the second LIDAR system. This may result in false ToF information as well. For example, if the first LIDAR emits a first light pulse and before the first light pulse is reflected and returns back to the first LIDAR, the first LIDAR detects a second light pulse that was emitted by the second LIDAR (if the first and second LIDARs are both emitting light pulses in the same general direction or if a light pulse emitted by the second LIDAR travels directly into the first LIDAR, for example), then the first LIDAR may incorrectly associate the light pulse from the second LIDAR as being the return light originating from the first light pulse. The above-provided example of another LIDAR system may only be one example of an active aggressor, and any other types of active aggressors may exist, such as a vehicle headlight, the sun, or any other object that may actively emit light. Additionally, these are only some examples of different types of aggressor objects, and any other type of aggressor object that may cause point cloud error may exist.

Although the above description may refer to aggressor objects as including retroreflective objects, specular objects, and/or active objects, aggressor objects may also refer to any other type of object that may produce invalid points in a point cloud representing the object as well. The existence of these invalid points may degrade the quality of the point clouds produced by a LIDAR system for the aggressor objects, as some of the point cloud data may be invalid. The amount of quality degradation that a particular aggressor object may cause in a point cloud generated by a particular LIDAR system may be quantified through the use of a point cloud quality metric (which may also be referred to herein as "image degradation," "ID," or the like). The point cloud quality metric may be proportional to a quantity and density of points displaced from a 3D ground truth beyond an allowable displacement error threshold. In other words, the point cloud quality may be a metric that provides an indication of the accuracy of the point cloud data with respect to the real-world object (for example, an aggressor object) that the point cloud represents. The larger the number of invalid points present in a point cloud, the lower the point cloud quality. A LIDAR system that produces point clouds of lower quality may cause a decrease in the ability of the system that the LIDAR system is incorporated into to function. For example, if a LIDAR system incorporated into an autonomous vehicle is producing lower quality point clouds, then the autonomous vehicle may experience an increased difficulty in performing autonomous navigation through an environment. That is, the autonomous vehicle may experience an increased difficulty in identifying the aggressor objects in the environment using point clouds generated by the LIDAR system.

In some embodiments, the impact of these aggressor objects on point cloud quality may be quantified by testing the performance of the LIDAR systems using a test target in a testing environment. This testing may be performed before the LIDAR systems are introduced to real-world environments that may include the aggressor objects. By performing this testing before a LIDAR system is introduced to real-world operation, steps may be taken to mitigate the occurrence of any low quality point clouds that the LIDAR system may create. For example, a LIDAR system may be calibrated for different types of aggressor objects that cause low quality point clouds to be generated. As another example, post-processing of point cloud data produced by the LIDAR system may be adjusted to account for the lower quality point cloud. As a third example, a LIDAR system producing lower quality point clouds for particular aggressor objects may simply not be used in a real-world environment. The information produced through this testing may also be used in any number of other ways as well.

In some instances, different types of test targets may be used to test the quality of points clouds produced by a given LIDAR system when encountering different types of aggressor objects. One example test target may include a retroreflector to test retroreflective aggressor objects as described above. In particular, this test target may include a retroreflector placed against one or more background panels. In some cases multiple test targets may be created to test different types of retroreflectors. For example, license plates and street signs may be two examples of retroreflectors. Thus, two different test targets may be created that may include these different objects. Alternatively, other retroreflective objects other than the actual real-world objects themselves may be employed. For example, a retroreflector that may exhibit the same or similar retroreflective properties may be used in place of a real-world object to avoid the necessity for having all of the different types of actual real-world objects in the testing environment. The configuration of a retroreflector test target may also be varied in any number of other ways. For example, the retroreflector may be displaced in front of one or more background panels by a particular distance. As another example, different sizes of retroreflectors and or background panels may also be used. Adjusting the configuration of the test targets in this manner may be used to exacerbate different failure mechanisms of a given LIDAR system. A failure mechanism may refer to a downside that may result from a particular type of LIDAR hardware architecture choice. That is, not all LIDAR systems may employ the same hardware designs, and these different hardware designs may impact how the particular LIDAR system may react to different types of aggressor objects (for example, how point clouds are generated by that particular type of LIDAR system design). For example, some LIDAR systems may be configured as bistatic LIDAR systems. A bistatic LIDAR system may refer to a LIDAR system in which an emitter and a detector are physically separated by a given distance. These bistatic LIDAR systems may sometimes observe optical crosstalk as a result of this configuration. Thus, to exacerbate this particular failure mechanism of optical crosstalk for testing purposes, a specific test target configuration may selected that may induce this optical crosstalk in the LIDAR system. This is only one example of failure mechanism that may exist based on LIDAR design, and any other failure mechanisms may also be applicable as well.

In some embodiments, the methods employed to test a given LIDAR system using a test target may first involve establishing a ground truth for the test target. This ground truth may be a baseline point cloud forming a highly accurate representation of the actual test target. The ground truth for the particular test target may be obtained in any number of ways. For example, a surveying tool may be used, a high precision LIDAR may be used, a high-precision laser range finder mounted to a high-precision gimbal may be used, or any other mechanism by which an accurate baseline point cloud may be generated to use as the ground truth for subsequent testing. Once the ground truth is established for the test target, a given LIDAR system may be tested using the test target. To perform this testing, the LIDAR system may be used to emit several light pulses towards the test target and detect any return light being received by the LIDAR system. This process may be continued until a sufficient number of points are captured to create a point cloud for the test target. The point cloud created by the LIDAR system may then be compared to the ground truth point cloud for the same test target. Based on the comparison, a point cloud quality metric for the LIDAR system may be determined. This process may be repeated using the same test target for any number of additional LIDAR systems. That is, different LIDAR systems may not necessarily produce the same quality point cloud even when being tested against the same test target. Thus, it may be desirable to obtain a point cloud quality metric for each individual LIDAR system to understand how each individual system may perform when faced with the aggressor object in a real-world environment. Additionally, any of the LIDAR systems may be tested against any number of different types of test targets. That is, even a single LIDAR system may have multiple associated point cloud quality metrics depending on the number of types of test targets the LIDAR system is tested against.

In some embodiments, the point cloud quality metric (or "image degradation") may be assessed using a score with arbitrary units and may be designed to clearly capture and communicate a figure of merit using a single numeric value (however, the metric may also be presented in any other form other than a single numeric value as well). This method of evaluation may be intended as a "perception relevant" metric that may grade image degradation based on its impact to the autonomous vehicle's (AV's) performance (for example, when the LIDAR system is associated with an AV). This point cloud quality metric may be calculated using a penalty function which may evaluate each individual point in a generated point cloud. More specifically, each point in the point cloud may be assigned an individual score based. The score may be determined based on the distance the point is from a center point of the point cloud. That is, the point cloud may include an allowable displacement error threshold (for example, a certain amount of error in the point cloud may be acceptable within a given tolerance threshold). This error threshold may represent a maximum allowable distance that a point may be from the center of the point cloud for the point to still be considered a "valid point." Any points included within this error threshold may be assigned an individual score of zero, and may not contribute to the point cloud quality metric score. On the other hand, any points located beyond the threshold may be counted and weighted proportional to the magnitude of the residual displacement error. That is, the further a point is away from the center of the point cloud, the higher the score assigned to the particular point. Once scores are obtained for all of the points in the point cloud (or, alternatively, a representative sample of points), the overall point cloud quality metric may then be determined by summing all of the individual scores. In this particular example, a point cloud quality metric of zero may be indicative of a perfect point cloud without any invalid points beyond the error threshold, with increasing scores indicating lower quality point clouds. That is, a larger point cloud quality metric may indicate that a large number of points were outside the acceptable error threshold. An illustration of a penalty function that may be applied to a point cloud may be presented in FIG. 3B and described in more detail below.

It should be noted, however, that the particular penalty function described above may be merely exemplary, and any other type of penalty function may also be employed as well. For example, a penalty function may be used that results in a higher score representing a higher quality point cloud. In this example, the penalty function may apply non-zero values to points included within the allowable error threshold. Additionally, the amount that the individual scores change as the distance from the center of the point cloud increases may differ based on the penalty function used as well. For example, there may be a linear change, an exponential change, or any other degree of change. Additionally, the penalty function employed may vary based on an number of factors, such as the particular test target being used, the LIDAR system being used, or any number of other factors as well.

In some embodiments, once a point cloud quality metric is obtained for a given LIDAR system with respect to a given aggressor object test target, the metric may be used for any number of purposes. For example, based on the metric, a given LIDAR system may be calibrated to produce a better point cloud for the particular aggressor object being tested using the test target. For example, the LIDAR system may be calibrated to produce a more quality point cloud when the LIDAR system encounters a retroreflective street sign in a real-world environment. This may be important because it may allow the AV to more accurately identify this type of street sign in the environment, which may improve the AV's ability to effectively navigate the real-world environment. As an alternative to the calibration of the LIDAR system itself, the data may be provided to a system that the LIDAR may be used with (for example, an AV), and that system may account for the deficiencies of the LIDAR system in post-processing of any data produced by the LIDAR system. For example, if it is determined through testing that a given LIDAR system tends to produce lateral invalid points for a retroreflective street sign, an AV may take this deficiency into account when performing post-processing of any data produced by the LIDAR system with respect to a street sign.

The point cloud quality metric may also be used for any other purposes as well. For example, point cloud quality may be an indicator of the presence of contaminants on the LIDAR system. For example, a lower quality point cloud may result from a LIDAR system being covered in dirt or dust. Likewise, the metric may provide an indication of how well a cleaning system of the LIDAR may be performing. The metric may also provide other LIDAR specific information, such as information about thermal weaknesses of the LIDAR system or whether differences exist in the LIDAR system's performance at different points in the Field of View (FOV) of the LIDAR system. These are only some examples of how the point cloud quality metric may be applied, and the metric may also be applied in any number of ways to improve the functionality of the LIDAR system (or a system, such as the AV, that the LIDAR system may be used with).

Turning to the figures, FIG. 1 illustrates an example system 100, in accordance with one or more embodiments of this disclosure. The system 100 may illustrate an environment 102 including one or more aggressor objects. As a first example, an aggressor object may include a retroreflective object, such as a retroreflective sign 103. This retroreflective object may result in a large amount of point cloud error because light (for example, emitted light 160) emitted from a LIDAR (for example, the LIDAR 105 of the vehicle 106) may be more likely to reflect from the retroreflective object and towards another object (for example, from the retroreflective sign 103 to the tree 104) before being reflected back to a LIDAR. Consequentially, the amount of time it may take for emitted light 160 to return to the LIDAR 105 may be increased, which may cause the LIDAR 105 to falsely determine that the street sign 103 is farther away from the LIDAR 105 than it actually is. Consequentially, one or more points associated with the street sign 103 on a point cloud generated by the LIDAR 105 for the street sign 103 may indicate that the street sign 103 is further away from the LIDAR 105 than it actually is. The street sign 103 may still reflect some of the emitted light pulses directly back towards the LIDAR 105. Thus, there may be some points on the point cloud that accurately represent the distance of the object to the LIDAR 105. However, because some of the emitted light may be reflected towards other objects before returning to the LIDAR 105, there may be multiple clusters of points in the point cloud associated with the street sign 103.

In addition to retroreflective or specular objects, a second example of an aggressor object may include an active object. An active object may refer to an object that may actively be sending light pulses towards a LIDAR rather than a passive object, such as a street sign, for example, that may simply reflect emitted light pulses back towards the LIDAR. One example of an active object may include other LIDAR systems that may exist in the environment 102. For example, there may be multiple vehicles traversing the external environment, and some or all of the vehicles may include their own individual LIDAR systems. In the particular example depicted in FIG. 1, the environment 102 may include four vehicles (for example, vehicle 106, vehicle 108, vehicle 109, and/or vehicle 110), with each of the four vehicles including its own LIDAR (for example, LIDAR 105, LIDAR 111, LIDAR 112, and/or LIDAR 113). The other active objects in the environment 102 may result in point cloud error because light pulses emitted by one LIDAR system may be detected by another LIDAR system and mistaken for return pulses originating from that LIDAR system's own emitted light pulses. That is, if the multiple vehicles are using their respective LIDAR systems to emit light pulses into the environment, then a first LIDAR may not be able to differentiate between return light pulses that originate from its own emitted light pulses or that originate from light pulses emitted by a second LIDAR system. This may result in false ToF information as well. As an example, FIG. 1 shows the LIDAR 112 of vehicle 109 detecting an emitted pulse 115 received directly from the LIDAR 113 of vehicle 108. FIG. 1 also shows the LIDAR 112 detecting an emitted pulse 116 from the LIDAR 111 of the vehicle 110 that has been from an object (for example, person 117) and towards the LIDAR 112 of the vehicle 109 rather than back to the LIDAR 111 of vehicle 110. The aggressor objects depicted in environment 102 may merely be examples of aggressor objects and any other types of aggressor objects may similarly exist in the environment 102.

In some embodiments, any of the LIDAR systems depicted in the figure may include at least one or more emitting devices 120, one or more detector devices 130, and/or one or more computing systems 140. A LIDAR system may also optionally include one or more emitter-side optical elements and/or one or more receiver-side optical elements. An emitting device 120 may be a laser diode for emitting a light pulse (for example, light pulse 160). A detector device 130 may be a photodetector, such as an Avalanche Photodiode (APD), or more specifically an APD that may operate in Geiger Mode (however any other type of photodetector may be used as well). The one or more detector devices 130 may detect return light (for example, return light 170). The return light 170 may be emitted light 160 that returns back to the LIDAR system after reflecting from an object in the environment 102. It should be noted that the terms "photodetector" and "detector device" may be used interchangeably herein. The computing system 140 (which may be the same as computing system 800, and may also be referred to herein as "signal processing elements," "signal processing systems," or the like) that may be used to perform any of the operations associated with point cloud quality determinations and/or LIDAR system calibration. It should be noted that although the one or more emitting devices 120, one or more detector devices 130, and/or one or more computing systems 140 are depicted as being associated with the LIDAR 112, these elements may similarly apply to any other LIDAR as well.

Figure 2A:
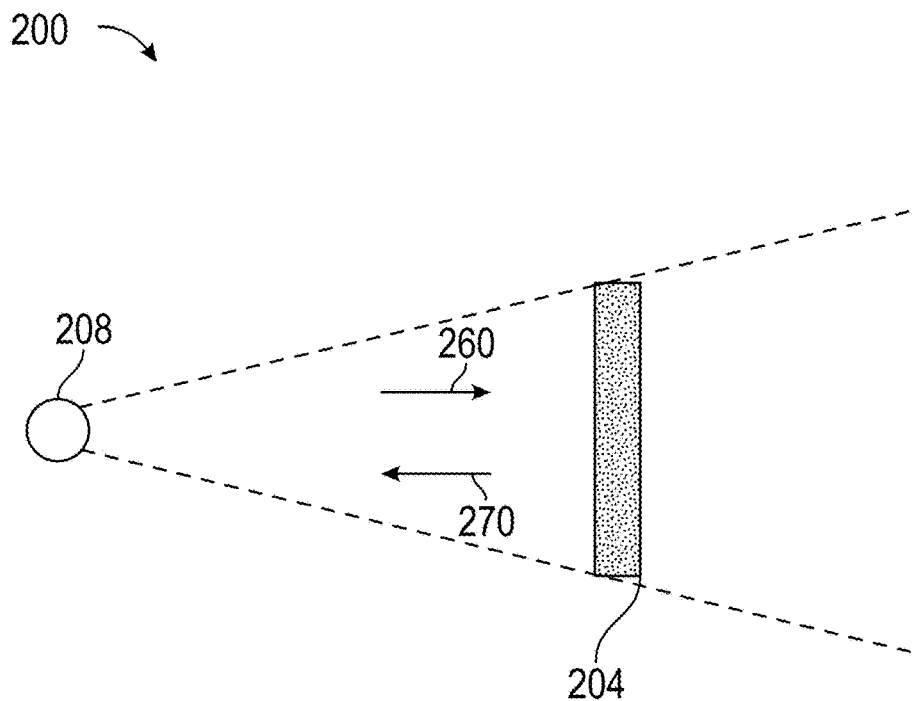
FIGS. 2A-2B depict an example illustration of the creation of a point cloud that may include one or more invalid points in a point cloud generated for an example aggressor object, in accordance with one or more example embodiments of the disclosure.
Figure 2B:
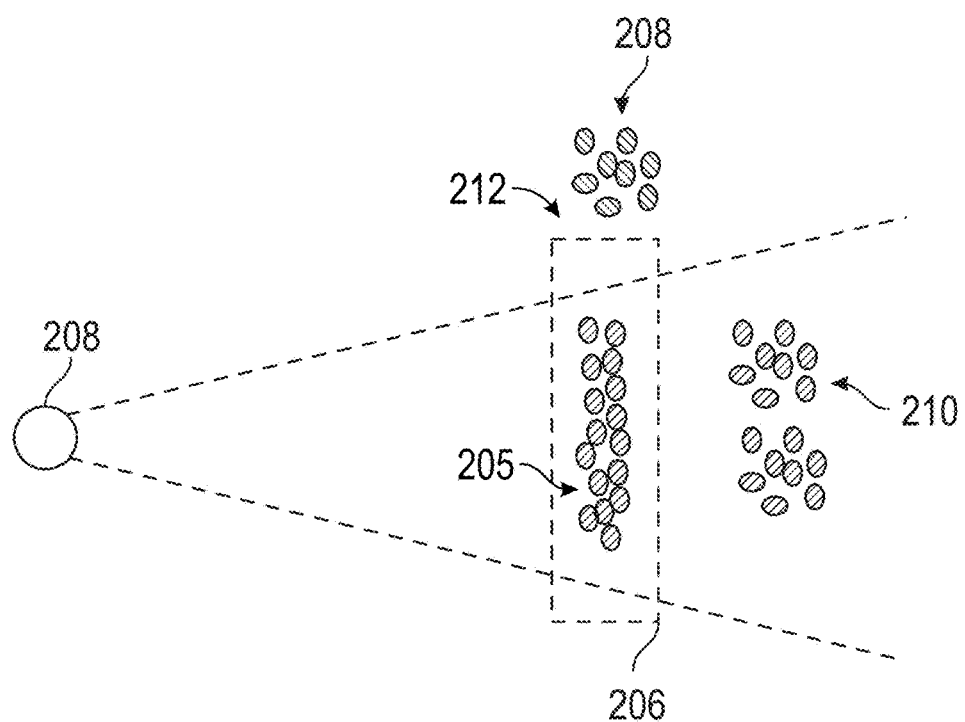

FIGS. 2A-2B depict an example illustration 200 of the creation of a point cloud 212 that may include one or more invalid points (for example, a first group of invalid points 208 and/or a second group of invalid points 210 as depicted in FIG. 2B) generated for an example aggressor object 204. For example, FIG. 2A may depict a LIDAR 202 (for example, LIDAR 105, LIDAR 111, LIDAR 112, and/or LIDAR 113, as well as any other LIDAR described herein) that may emit a light pulse 260 into an environment and receive return light 270 from an object in the environment (for example, aggressor object 204). The aggressor object may be any type of aggressor object described herein (for example, a retroreflective object, a specular object, an active object, or any other type of object). In some instances, the aggressor object 204 may be a part of a test target (for example, any of the test targets depicted in FIGS. 4A-4C, or any other test targets depicted or described herein) that may exist in a testing environment with the LIDAR 202. However, the illustration 200 may also apply to any point cloud generated based on real-world objects encountered by a LIDAR system as well. Upon receipt of the return light 270, the LIDAR 202 may create a point based on an amount of time between an emission of the light pulse 260 and a time at which the return light pulse 270 is detected by the LIDAR 202 (for example, a ToF of the light pulse). This process may be repeated until a full point cloud including several of these points is generated for the aggressor object 204. The point cloud 212 may provide a representation of properties of the aggressor object 204, such as its size, distance from the LIDAR 202, and/or any other information relating to the aggressor object 202. An example of a resulting point cloud 212 may be depicted in FIG. 2B. As is illustrated by the point cloud, a number of points 205 may be generated that may represent the aggressor object 204 depicted in FIG. 4A.

Ideally, the point cloud 212 generated for the aggressor object 204 may include one or more points 205 corresponding to locations on the aggressor object 204, such that the point cloud 212 as a whole would appear visually similar to the size and/or shape of the actual aggressor object 204. Additionally, a certain amount of error may be acceptable as well. For example, ideally, the point cloud 212 may be limited to including points within an example bounding box 206 depicted as the dashed box around the aggressor object 204 (for example, the points 205). However, properties specific to the aggressor object 204 may cause one or more points to be generated outside of the bounding box 206. For example, as depicted in the figure, the aggressor object 204 may cause a first group of invalid points 208 and/or a second group of invalid points 210 to be generated. For example, the first group of invalid points 208 may represent lateral invalid points. These lateral invalid points may be in in azimuth or elevation, with the one or more lateral invalid points depicted in the figure being shown in azimuth. A literally invalid point may indicate that an error exists in angle determinations, and a radially invalid point may indicate an error in range determinations. Whether lateral or radial invalid points are observed may also depend on the particular architecture of the LIDAR system. As another example, the second group of invalid points 210 may be radial invalid points. These radial invalid points may be generated in addition to, or alternatively to, the one or more lateral invalid points. These radial invalid points may be projected in front of or behind the physical location of the aggressor object 204. In some cases, one or more points may also be created in any other location outside of the bounding box 206 of the aggressor object 204 as well. The detection of these points outside of the bounding box 206 may lead to a number of problems with the LIDAR 202. This may be because the point cloud 212 generated using the LIDAR 202 may be used by a vehicle to assist the vehicle in performing semi-autonomous or fully autonomous functions while navigating the environment. If the vehicle is detecting points outside of the bounding box 206 of the aggressor object 204, the vehicle may incorrectly determine that an object is occupying the physical space associated with the points outside of the bounding box 206, whereas in reality these may actually just be invalid points resulting from the properties of the aggressor object 204.

The existence of these invalid points (for example, the first group of invalid points 208, the second group of invalid points 210, and/or any other invalid points that may be generated) may degrade the quality of the point clouds produced by the LIDAR 202 for the aggressor objects 204, as some of the point cloud data may be invalid. The quality of a point cloud may be a metric that provides an indication of the accuracy of the point cloud data with respect to the real-world object that the point cloud represents. For example, the larger the number of invalid points present in a point cloud, the lower the point cloud quality. A LIDAR system that produces point clouds of lower quality may cause a decrease in the ability of the system that the LIDAR system is incorporated into to function. For example, if the LIDAR 202 is incorporated into an autonomous vehicle and is producing lower quality point clouds, then the autonomous vehicle may experience an increased difficulty in performing autonomous navigation of an environment. Additionally, the point cloud quality may vary depending on the specific LIDAR used. Thus, it may be desirable to quantify the quality of point clouds produced by different LIDAR systems so as to better understand the quality of data produced by a given LIDAR operating in a real-world environment. Having the capability to quantify the quality of point cloud produced by a given LIDAR may allow for the LIDAR to be calibrated so that the LIDAR can produce a higher quality point cloud for different types of aggressor objects that may exist in a real-world environment. For example, the LIDAR systems may be calibrated before the LIDAR system is introduced to a real-world environment where such aggressor objects may exist. This calibration may be performed using different physical test targets in a testing environment. In some instances, different types of test targets may be used to calibrate the LIDAR system for the different types of aggressor objects. For example, a test setup used to calibrate the LIDAR system for retroreflectors may involve the use of a retroreflective test target.

Figure 3A:
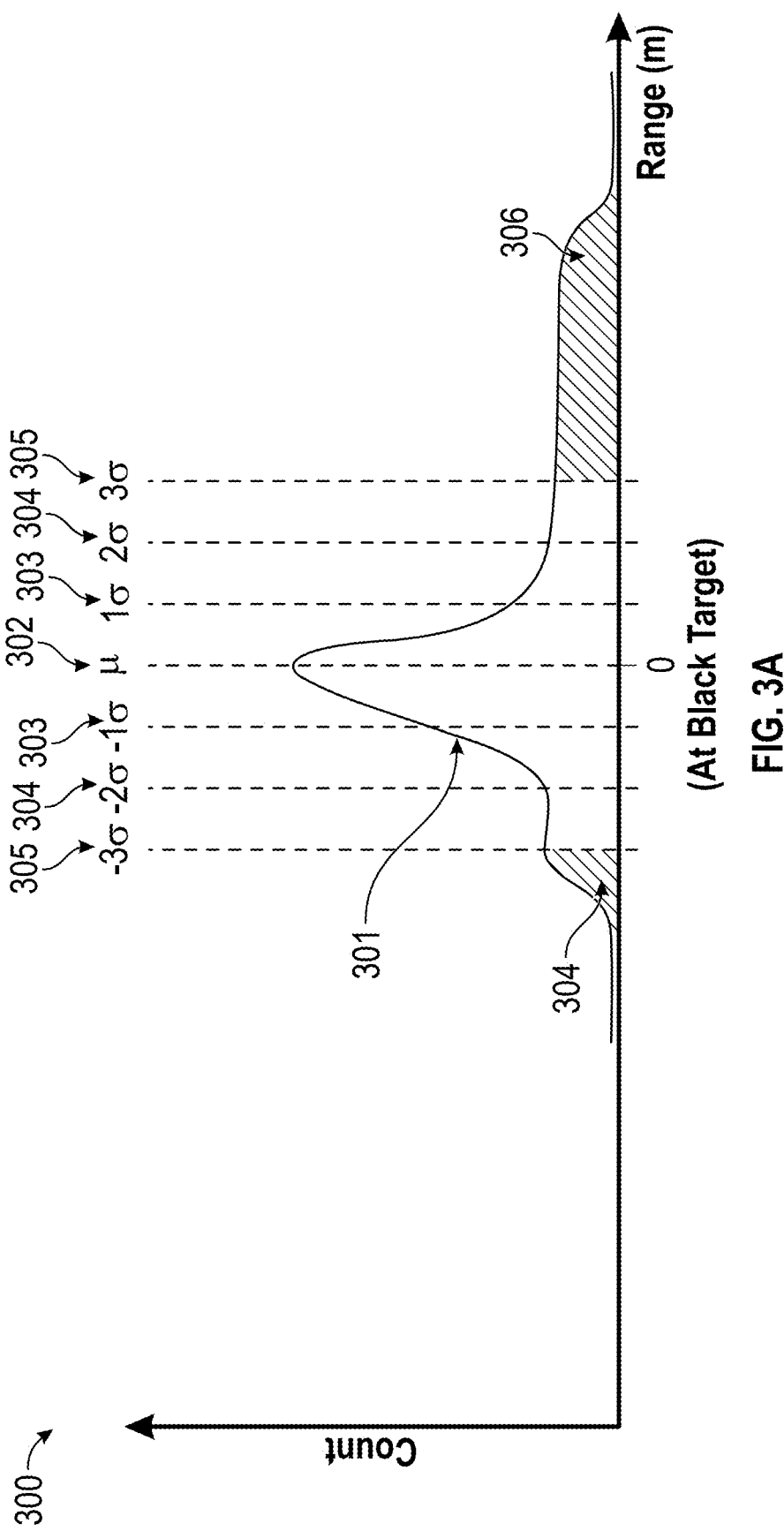
FIG. 3A depicts an example plot illustrating a distribution of points in a point cloud, in accordance with one or more example embodiments of the disclosure.

FIG. 3A depicts an example plot 300 illustrating a distribution 301 of points in a point cloud. For example, the plot 300 may illustrate an example distribution 301 representative of a point cloud generated by a LIDAR system during testing using a particular type of test target as described herein. The y-axis of the plot 300 may represent a number of points generated, and the x-axis of the plot 300 may represent location (for example, a distance between a physical location represented by a point in the point cloud and the LIDAR system). In other words, the amplitude of the distribution 301 may indicate an amount of points included in the point cloud at a particular location. The plot 300 may include a zero point 302, which may represent a center of the point cloud (that is, the center of the distribution 301). In some instances, the zero point 302 may not necessarily represent the center of the test target depending on the amount of error present in the point cloud generated for the test target. However, in some cases, if the amount of error is small, the zero point 302 may more closely represent the center of the test target. The portions of the distribution 301 to the left and right of the zero point 302 may represent a number of points included in the point cloud at given distances away from the center of the point cloud. For instance, the plot 300 may depict a number of standard deviations away from the zero point 302, such as, for example, a first standard deviation 303, a second standard deviation 304, a third standard deviation 305, and any other number of standard deviations. The increasing standard deviations moving from the zero point 302 to the left along the distribution 301 may represent points in the point cloud that are detected behind the physical location of the aggressor object (that is, the points on the distribution to the left of the zero point 302 may represent points further away from the LIDAR than the points representing the actual location of the aggressor object). Likewise, the standard deviations moving from the zero point 302 to the right along the distribution may represent points in the point cloud that are detected in front of the physical location of the aggressor object (that is, the points on the distribution to the left of the zero point 302 may represent points closer to the LIDAR than the points representing the actual location of the aggressor object). These are merely examples, however, and the points in the distribution 301 may also represent lateral invalid points (for example, points to the left and right of the aggressor object) as well as any other points outside of the acceptable error threshold in general (for example, any other points that exist outside of the bounding box 206 depicted in FIG. 2).

In some embodiments, the particular standard deviations used in conjunction with the distribution 301 may represent a range error threshold that may be used to determine which points in the point cloud are invalid points beyond the acceptable error range threshold and are thus impacted by the penalty function that is described below with respect to FIG. 3B. That is, in the example distribution 301 depicted in FIG. 3A, the acceptable error range threshold may include and points within three standard deviations from the zero point 302 (however, the acceptable error range threshold may also be defined by any other distance other than three standard deviations as well). For example, a first group of points 304 to the left of the third standard deviation 305 may include a group of invalid points in the point cloud that may be located behind the location of the aggressor object on the test target as described above. A second group of points 306 to the right of the third standard deviation 305 may include a group of invalid points in the point cloud that may be located in front of the location of the aggressor object on the test target as described above. Again, these may only be examples, and the first group of points 305 and second group of points 306 may similarly represent invalid points to the left and right of the points representing the aggressor object or above and below the points representing the aggressor object. For example, if the test target includes a retroreflector, the points in the distribution 301 within the three standard deviations may be points that represent the retroreflector (or even points outside the retroreflector within the acceptable error threshold), and the first group of points 305 and/or second group of points 306 may represent any invalid points outside of this acceptable threshold range (whether they be located above, below, to the left, to the right, behind, or in front of the points representing the retroreflector). Additionally, although the figure may depict the acceptable error range threshold as being three standard deviations away from the zero point 302 of the distribution 301, any other error range threshold may also be used as well. Furthermore, this acceptable error range threshold may vary depending on any number of factors, such as the particular test target and/or LIDAR system used, the type of aggressor object, or any other factor.

Figure 3B:
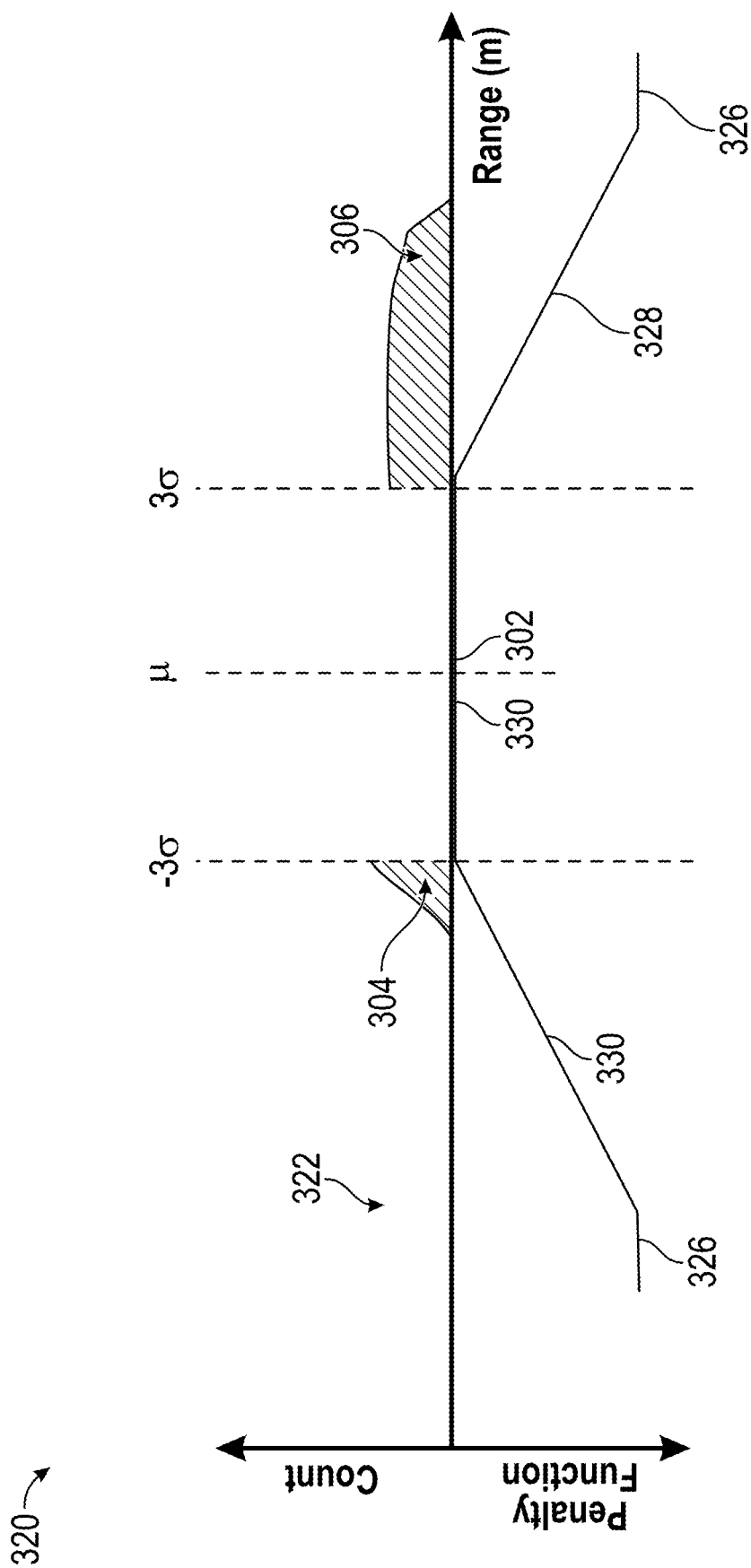
FIG. 3B depicts an example penalty function that may be used to quantify point cloud quality, in accordance with one or more example embodiments of the disclosure.

FIG. 3B depicts a plot 320 of an example penalty function 322 that may be used to quantify point cloud quality for a particular LIDAR system. The penalty function 322 may be a function that is applied to individual points in the generated point cloud (for example, as represented by the distribution 301) to obtain a score for each of the points. The scores associated with each of the points may then be aggregated to obtain a total score, which may represent the point cloud quality metric for the particular LIDAR system in associated with the test target the LIDAR system is being tested against. As illustrated by the figure, the penalty function 322 may have a value of zero for a first portion 330 of the penalty function 322. The first portion 330 of the penalty function 322 may correspond to the portion of the distribution 301 within the acceptable error range threshold. The penalty function 322 may only impact the points in the point cloud that fall outside of the range error threshold represented by the three standard deviations from the zero point 302 in FIG. 3A. That is, as mentioned above, with the particular penalty function used in FIG. 3B, a score of zero may be ideal for a given point cloud. Also illustrated in the figure is that the penalty function 322 includes regions (for example, second portions 330) in which the penalty function is a nonzero value. For example, within these regions, the penalty function 322 may linearly increase as the distance from the zero point 302 increases. Thus, for points that fall outside of the acceptable error range threshold (such as, for example, the first group of points 305 and/or second group of points 306 depicted in the distribution 301 of FIG. 3A), the penalty function 322 may produce a score that may increase depending on how far from the acceptable error threshold the point is found. Thus, points that exist the furthest left in the distribution 301 (or the furthest right) may produce the largest scores after the penalty function 322 is applied. In some cases, past a particular distance from the zero point 302, the penalty function 322 may maintain the same maximum score (for example, as shown in the third portions 326). With this example penalty function 322, the higher the aggregate score produced by the points in the point cloud, the lower quality the point cloud. However, it should be noted that the penalty function 322 depicted in FIG. 3B is only one example of a type of penalty function. For example, the penalty function 322 may be any other type of function (including nonlinear functions or functions that may not include a maximum value as shown in the third portions 326). The penalty function 322 may, in some cases, also have a non-zero value at the points within the acceptable error threshold range (and zero values for points outside the acceptable error threshold). That is, in some cases, a larger aggregate score may be indicative of a higher quality point cloud. What the aggregate score represents in terms of point cloud quality thus depends on the particular type of function that is used as the penalty function 322. In some cases, the penalty function 322 that is used may vary depending on any number of factors, such as the type of aggressor object being tested, the particular LIDAR system being tested, the particular failure mechanism being exacerbated, among any other number of limitless factors.

A more specific description of the application of an example penalty function may be include the following (the specific application described below may merely be exemplary, and the penalty function may also be applied in any other manner depending on the particular penalty function that is employed). The point cloud quality metric may be composed of at least two components, such as, for example, a radial score and a lateral score. These two scores may be calculated independently and then combined to obtain the final point cloud quality metric. To calculate the radial score and the lateral score, points from a point cloud (for example, the example distribution 301 shown in FIG. 3A) may first be grouped into different categories. In some cases, the points may be grouped into four different categories. A first category may include points that are outside the target backing's (the "target backing" may refer to any of the backings described below, such as, for example, the first backing 406 and/or the second backing 408) angular subtense plus $\varepsilon_{lateral}$ ($\varepsilon_{lateral}$ may represent a lateral displacement error threshold, which may be a sum of a range accuracy requirement and a range precision requirement). A second category may include points that are within the angular subtense of the retroreflector plus $\varepsilon_{lateral}$. A third category may include points that are within the angular subtense of the target backing plus $\varepsilon_{lateral}$, outside of the angular subtense of the retroreflector plus $\varepsilon_{lateral}$, and radially displaced from the backing by greater than $\varepsilon_{radial}$ or less than $-\varepsilon_{radial}$ ($\varepsilon_{radial}$ may represent a radial displacement error threshold, which may be an outer boundary edge fidelity requirement). A fourth category may include points that are within the angular subtense of the backing plus $\varepsilon_{lateral}$, outside of the angular subtense of the retroreflector plus $\varepsilon_{lateral}$, and radially within $\pm\varepsilon_{lateral}$ of the backing's plane.

Once these four categories of points are established, the radial score may be calculated for each point in categories two and three using the following piecewise function (Equation 1):

$$ID_{radial} = \begin{cases} 0 & |r_{point} - r_{GT}| < \varepsilon_{radial} \\ r_{cap} * pf & |r_{point} - r_{GT}| - \varepsilon_{radial} > r_{cap} \\ (|r_{point} - r_{GT}| - \varepsilon_{radial}) * pf & \text{otherwise} \end{cases}$$ (Equation 1)

In Equation 1, $r_{point}$ may represent a range to the point, $r_{GT}$ may represent a target's ground truth range (at that azimuth and elevation), $r_{cap}$ may represent the range at which points are no longer dynamically penalized and may be set to 1 m, and pf may represent the "penalty function" and may be set to 10 (or any other value).

Likewise, the lateral score may be calculated for each point belonging to the third category. The calculation for $L_{az}$ and $L_{el}$ as described below may be dependent on which side of the retroreflector the point lies. If a point lies on the right side of the retroreflector, then the ground truth ($L_{GT,az}$) may be the azimuth coordinate of the right edge of the retroreflector. Similarly, if a point lies below the retroreflector, then the ground truth ($L_{GT,el}$) may be the coordinate of the bottom edge of the retroreflector. The lateral score may be calculated using the following equations:

$$L_{az} = |L_{point,az} - L_{GT,az}|$$ (Equation 2)

$$L_{el} = |L_{point,el} - L_{GT,el}|$$ (Equation 3)

$$L = \sqrt{L_{az}^2 + L_{el}^2} - \varepsilon_{lateral}$$ (Equation 4)

$$ID_{lateral} = \begin{cases} 0 & L \leq 0 \\ r_{GT} * \frac{L_{cap}\pi}{180} * pf & L > L_{cap} \\ r_{GT} * \frac{L\pi}{180} * pf & \text{otherwise} \end{cases}$$ (Equation 5)

In Equations 2-5, $L_{point,az}$ may represent the azimuth coordinate of the points, $L_{point,el}$ may represent the elevation coordinate of the points, $L_{GT,az}$ may represent the azimuth coordinate of the left or right edge, whichever is closer to $L_{point,az}$, $L_{GT,el}$ may represent the elevation coordinate of the top or bottom edge, whichever is closer to $L_{point,el}$, $L_{cap}$ may represent the angle at which points are no longer dynamically penalized (as non-limiting example, this angle may be set to 18.3 degrees), and pf may represent the penalty function and may be set to 10 (or any other value).

Once the radial and lateral scores for each point are determined, a total score may then be calculated. The total score may be the magnitude of radial and lateral scores for each point. A total image degradation score per point (n) may be calculated using the following equation:

$$ID_n = \sqrt{ID_{radial}^2 + ID_{lateral}^2}$$ (Equation 6)

In Equation 6, $ID_n$ may represent a total image degradation, $ID_{radial}$ may represent an image degradation metric in the radial dimension, and $ID_{lateral}$ may represent an image degradation metric in the lateral direction.

A frame score may then be determined based on the total score. A frame score may be a sum of all $ID_n$ scores accumulated for a frame. The scores may be added up for all of the points (for example, using the below equation).

$$ID = \sigma_{n=1}^{N} ID_n \quad \text{(Equation 7)}$$

In Equation 7, N may represent a total number of points present in the frame.

In some embodiments, once a point cloud quality metric is obtained for a given LIDAR system with respect to a given aggressor object test target, the metric may be used for any number of purposes. For example, based on the metric, a given LIDAR system may be calibrated to produce a better point cloud for the particular aggressor object being tested using the test target. For example, the LIDAR system may be calibrated to produce a more quality point cloud when the LIDAR system encounters a retroreflective street sign in a real-world environment. This may be important because it may allow the AV to more accurately identify this type of street sign in the environment, which may improve the AV's ability to effectively navigate the real-world environment. As an alternative to the calibration of the LIDAR system itself, the data may be provided to a system that the LIDAR may be used with (for example, an AV), and that system may account for the deficiencies of the LIDAR system in post-processing of any data produced by the LIDAR system. For example, if it is determined through testing that a given LIDAR system tends to produce lateral invalid points for a retroreflective street sign, an AV may take this deficiency into account when performing post-processing of any data produced by the LIDAR system with respect to a street sign.

The point cloud quality metric may also be used for any other purposes as well. For example, point cloud quality may be an indicator of the presence of contaminants on the LIDAR system. For example, a lower quality point cloud may result from a LIDAR system being covered in dirt or dust. Likewise, the metric may provide an indication of how well a cleaning system of the LIDAR may be performing. The metric may also provide other LIDAR specific information, such as information about thermal weaknesses of the LIDAR system or whether differences exist in the LIDAR system's performance at different points in the Field of View (FOV) of the LIDAR system. These are only some examples of how the point cloud quality metric may be applied, and the metric may also be applied in any number of ways to improve the functionality of the LIDAR system (or a system, such as the AV, that the LIDAR system may be used with).

Figure 4A:
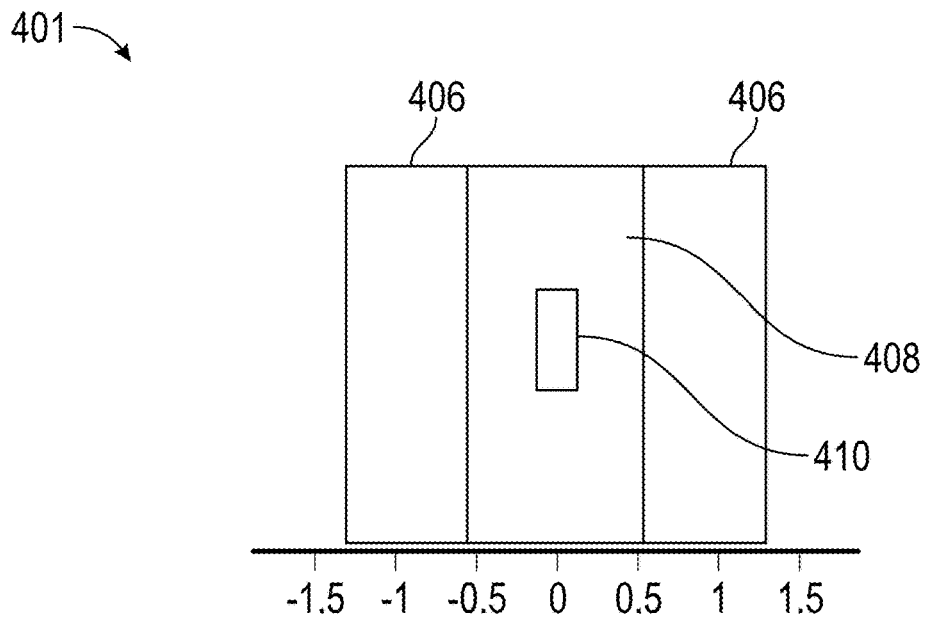
FIGS. 4A-4C depict example test targets, in accordance with one or more example embodiments of the disclosure.
Figure 4B:
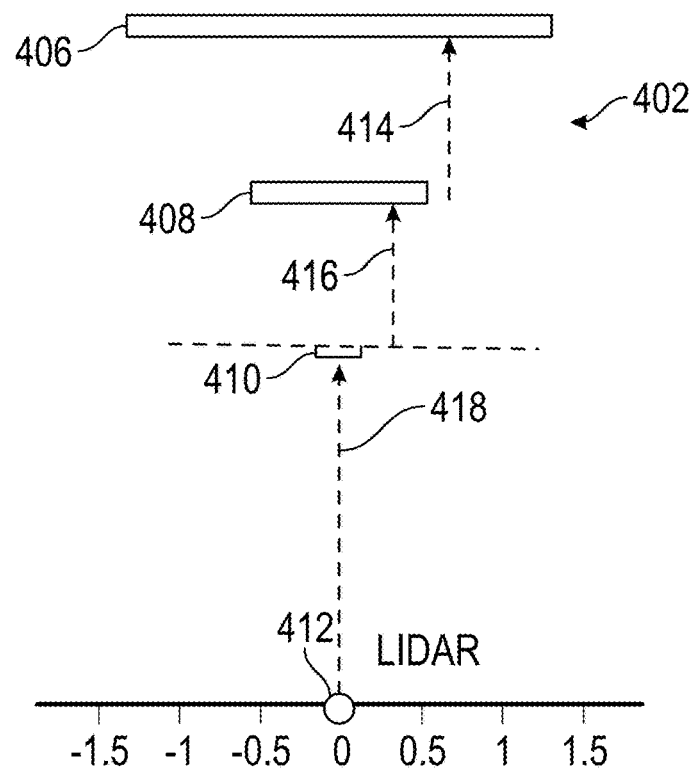
Figure 4C:
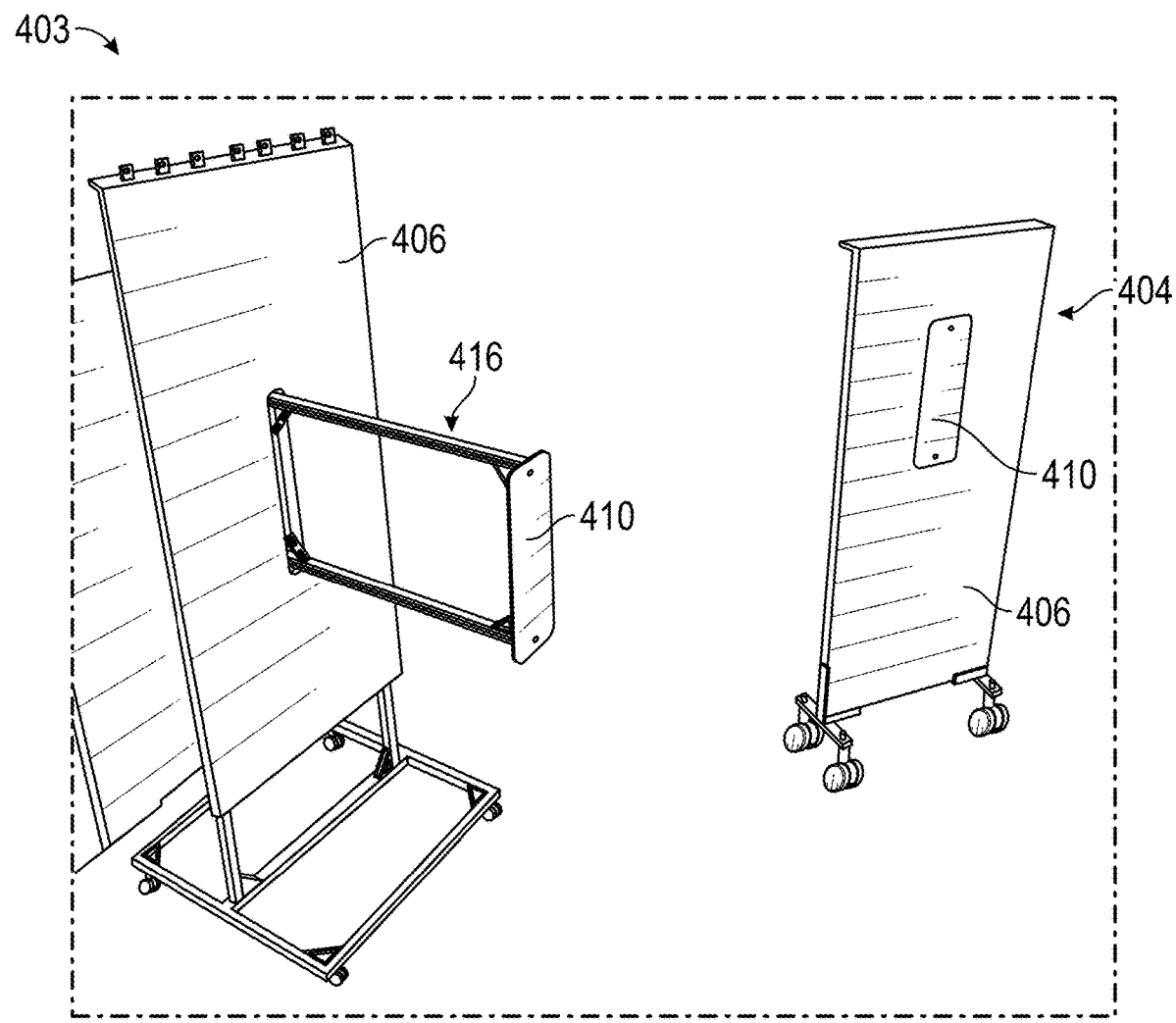

FIGS. 4A-4C depict example test targets (for example, test target 401, test target 402, test target 403, and/or test target 404) that may be used to quantify the quality of point clouds produced by a LIDAR (for example, LIDAR) for a given type of aggressor object as described herein. In particular, the test targets depicted in these figures may illustrate test targets that may be used to test the quality of point cloud produced by LIDAR systems for retroreflector-type aggressor objects. However, any other types of test targets may similarly be used to test specular objects (as well as any other type of aggressor object) as well. The test targets depicted in FIGS. 4A-4C may be depicted from different perspectives (for example, test target 401 may be depicted from a front-facing perspective, test target 402 may be depicted from a top-down perspective, and test target 403 and test target 404 may be depicted from an orthogonal perspective. In general, and as illustrated in FIG. 4A, an example test target 401 may include a first backing 406, a second backing 408, and/or a retroreflector 410. The retroreflector 410 may be an object that it is desired to obtain a point cloud quality for a given LIDAR. For example, the retroreflector 410 may be a specific type of retroreflective object that may exist in a real-world environment, such as a license plate or street sign. However, in other cases, the retroreflector 410 may not necessarily be the specific real-world object, but may rather be another object that may exhibit the same or similar retroreflective properties as the real-world object. Additionally, the retroreflector 410 may be removeably attached to the test target 402, such that different types of retroreflectors may be tested against a given LIDAR. For example, it may be desirable in some cases to conduct a first test to determine the point cloud quality generated by a LIDAR for a street sign, and then to conduct a second test to determine the point cloud quality generated by the LIDAR for a license plate. This may be because although both the street sign and license plate are retroreflective objects, there may be differences in how light interacts with these two different types of retroreflectors. Thus, determining point cloud quality for a LIDAR system for one type of retroreflector may not necessarily be able to be generalized to all retroreflective objects. It may be important to understand how the LIDAR reacts (for example, the quality of point cloud produced) to different types of retroreflective objects because the LIDAR would be encountering more than one type of retroreflective object in the real-world. If the LIDAR was only tested against one type of retroreflector, then it may be known that the LIDAR may be able to generate high quality point clouds for that particular retroreflector, however, the LIDAR may also generate lower quality point clouds for other retroreflector objects it may encounter in the real-world. This may present problems if the LIDAR is incorporated into an autonomous vehicle and the vehicle relies on the LIDAR data to perform autonomous functions, as the effectiveness of the LIDAR in performing the functions in light of untested retroreflectors may be impacted. However, in some cases, the quality of point cloud produced by a LIDAR may be generalized to other types of retroreflectors if the quality of point cloud generated by the LIDAR for one type of retroreflector is determined through testing and the properties of other types of retroreflectors are known.

In some embodiments, the first backing 406 may be a white backing and the second backing 408 may be a black backing. For example, the white backing may be 94% diffuse (or any other percentage) and the black backing may be 3% diffuse (or any other percentage). The first backing 406 being a white backing and the second backing 408 being a black backing may represent real-world scenes that may be common in certain areas (for example, dense urban areas), such as headlights or license plates mounted to dark vehicle body panels, or a traffic sign with an effectively empty background. The first backing 406 being white and the second backing 408 being black may force a LIDAR system being tested by the test target to generate a point cloud under a worst-case scenario. That is, a LIDAR system may have a dynamic range, and may increase or decrease laser power (for example, emitted light power) based on observed intensity of signal. By including the transition from the white background to the black background to the retroreflector, then maximum transition in reflectivity may occur before the LIDAR system begins generating points for the retroreflector. In other words, the transition from the white background to the black background may force the LIDAR system to accommodate a maximum dynamic range. In some embodiments, however, the test targets may include any other types and/or combinations of backgrounds as well. For example, a test target can include a black background behind a white background, or may include only a white background or a black background, as well as backgrounds of any other color and/or type. Additionally, although example sizes for the test targets may be provided in the figures, any other size may be used for any of the portions of a given test target as well.

While generally speaking, the test targets may, in some embodiments, generally include a first backing 406, a second backing 408, and/or a retroreflector 410, some of the test targets may be configured differently than other test targets (and also some test targets may include only some of these elements or additional elements). For example, as illustrated in FIG. 4B, an example test target 402 may include a retroreflector 410 that may be positioned at a given first distance 416 in front of a second backing 408, and the second backing 408 may also be positioned at a second distance 414 from the first backing 406. The test target 402 may be presented from a top-down perspective. An example of this test target 402 from an orthogonal perspective may also be provided as test target 403 in FIG. 4C. That is, FIG. 4C may provide another perspective of the distance 416 provided between the retroreflector 410 and the second backing 408. The test target 402 with the retroreflector positioned at a distance 416 in front of the second backing 408 may serve to stimulate invalid points in the presence of range resolution impairments. That is, the distance 416 may create the potential for range resolution limitations of the system to be observed and quantified.

FIG. 4C may also illustrate another example test target 404 configuration. The test target 404, for example, may have a retroreflector 410 that is positioned directly on (or substantially close to) the second backing 408. That is, the retroreflector 410 in the test target 404 may be positioned substantially closer to the backing 408 than the retroreflector in the test target 403. The test target 404 having the retroreflector 410 positioned directly on (or substantially close to) the second backing 408 may stimulate invalid points in the absence of range resolution impairments. Although not depicted in the figure, the test target 404 may also include the first backing 406 as well. Like the test target 403, the test target 404 may stress the dynamic range through introduction of a rapid change in reflectivity with a retroreflector 410 in front of a low-reflectivity target (for example, the second backing 408 that is a black backing). The retroreflector 410 (as well as any of the backings, such as the first backing 406 and/or the second backing 408) included with the test target may also be of any given size and/or shape. Additionally, the retroreflector 410 may be provided at any third distance 418 from the LIDAR system 412 being tested by the test target 402 (or any other test target). The LIDAR 412 may be same as LIDAR or any other LIDAR described herein or otherwise. The particular test target placed in front of the LIDAR 412 may then be used to quantify a point cloud quality produced by the LIDAR 412 under the circumstances present in the test environment.

Figure 5A:
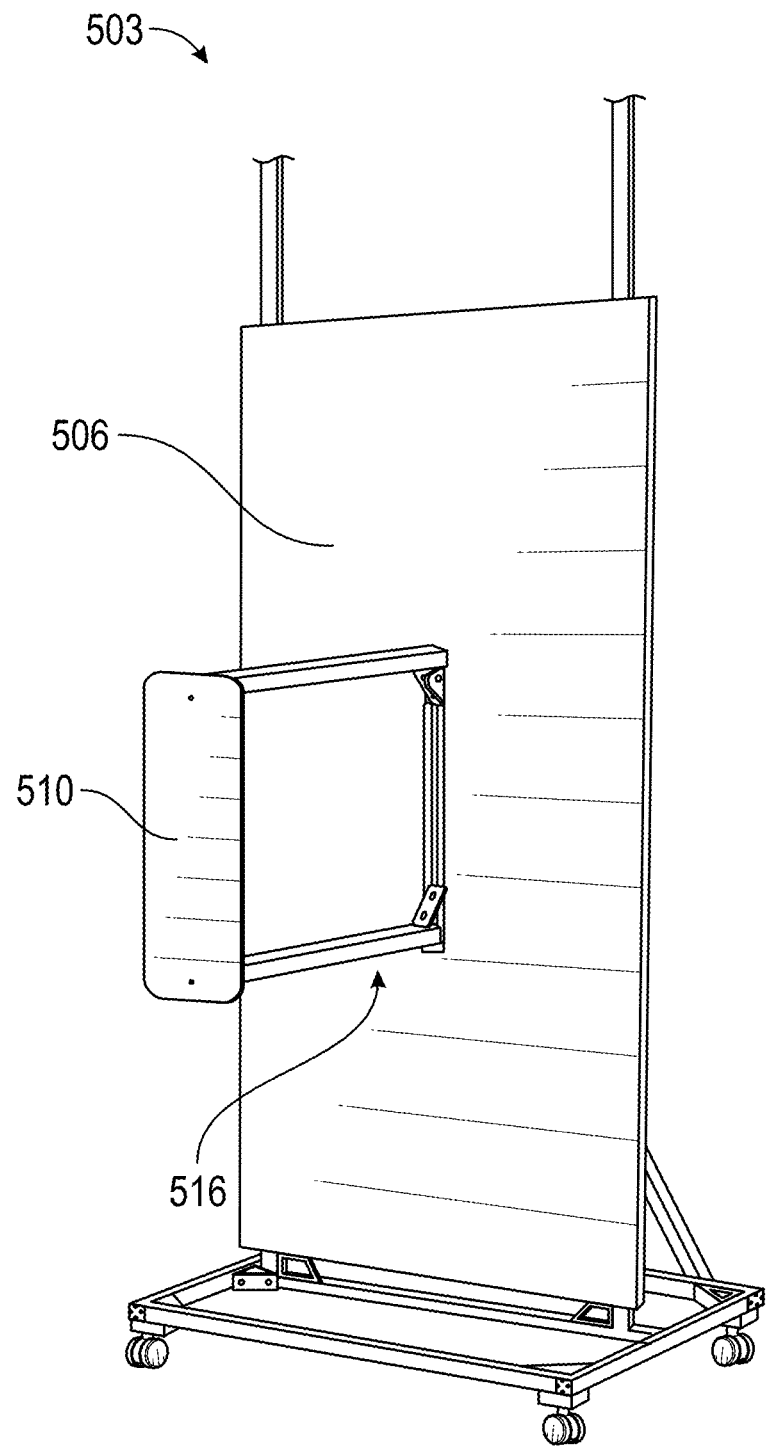
FIGS. 5A-5B depict an example of a point cloud generated for an example test target, in accordance with one or more example embodiments of the disclosure.
Figure 5B:
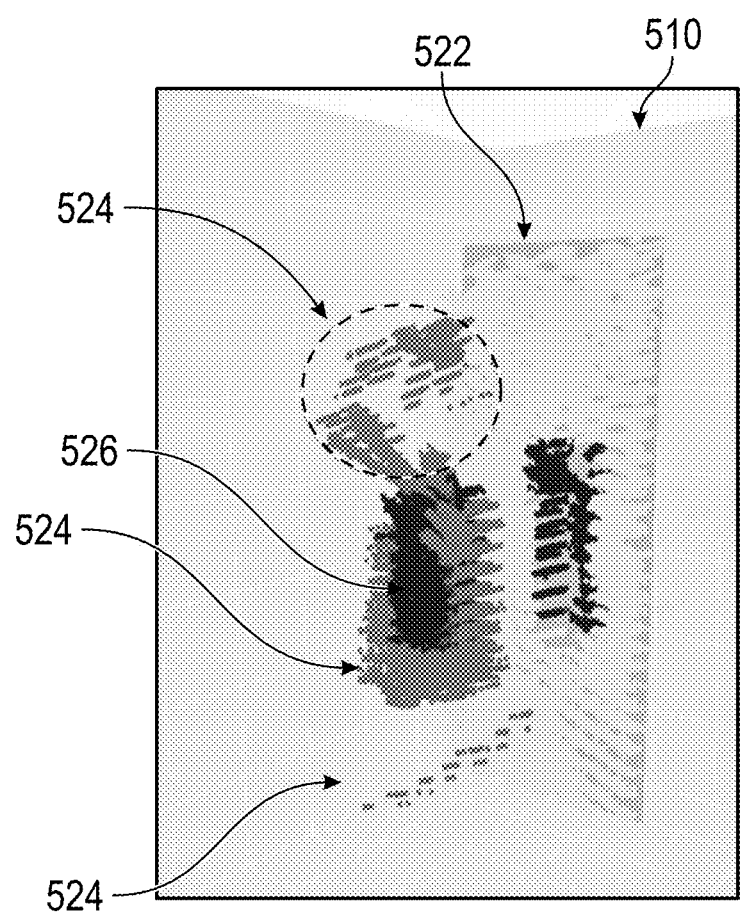

FIGS. 5A-5B depict an example of a point cloud generated for one of the example test targets depicted in FIG. 4C. Particularly, FIG. 5A may depict an example test target 503 and FIG. 5B may depict an example point cloud 510 generated based on the example test target 503. In some embodiments, the test target 503 may be the same as test target 403 depicted in FIG. 4C. For example, test target 503 may include a backing 506 and a retroreflector 510. The retroreflector 510 may be positioned at a given distance 516 from the background 506. As illustrated in FIG. 5B, The example point cloud 510 generated based on the test target 503 may include one or more first points 522, one or more second points 524, and/or one or more third points 526. The one or more first points 522 may be points that represent the backing of the test target (for example, the backing 506). Although the test target 503 in FIG. 5A only depicts one backing, the test target 503 may also include two or more backings as described above (for example, a white backing and a black backing). The one or more third points 526 may be points that represent the retroreflector 510. In some cases, the one or more third points 526 may also include points that may not exactly represent the size and/or shape of the retroreflector 510, but may also include points within an acceptable error threshold (for example, as illustrated by the bounding box 206 depicted in FIG. 2B). The one or more second points 524 may represent invalid points in the point cloud 510. That is, the one or more second points 524 may include any points not included within the one or more third points 526, or, in other words, any points not included within the acceptable error threshold. As illustrated by the figure, the invalid points may include points on any side of the retroreflector 510, such as above, below, to the left, to the right, in front of, or behind, for example.

Figure 6A:
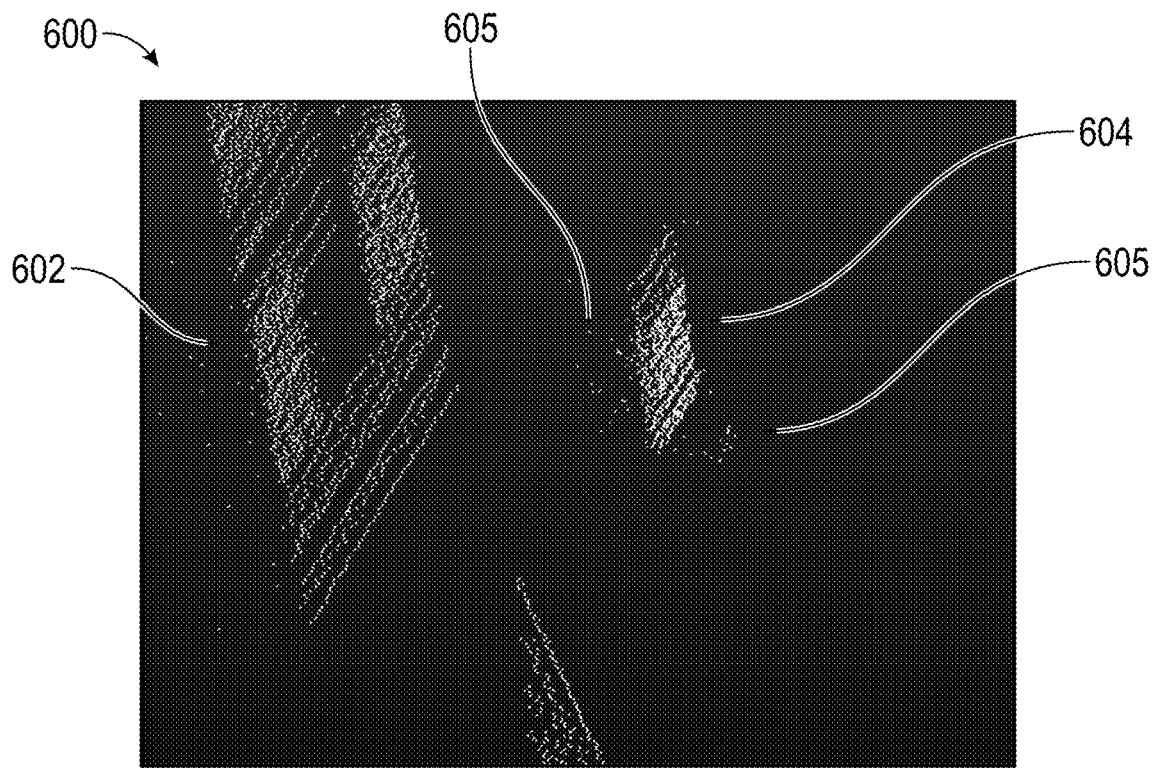
FIGS. 6A-6B depict additional example point clouds, in accordance with one or more example embodiments of the disclosure.

FIGS. 6A-6D depict additional examples of point clouds generated based on example test targets. FIG. 6A may depict a first example point cloud 600 for a given test target. For example, the point cloud 600 may correspond to the test target 403 depicted in FIG. 4C (that is, the point cloud may be representative of a test target from an orthogonal perspective). The point cloud 600 may include a first set of points 602 corresponding to a backboard of the test target and a second set of points 604 corresponding to a retroreflector displaced from the backboard of the test object. The point cloud 600 may also include one or more invalid points 605, which may be located outside an acceptable error threshold range of the retroreflector on the test target.

Figure 6B:
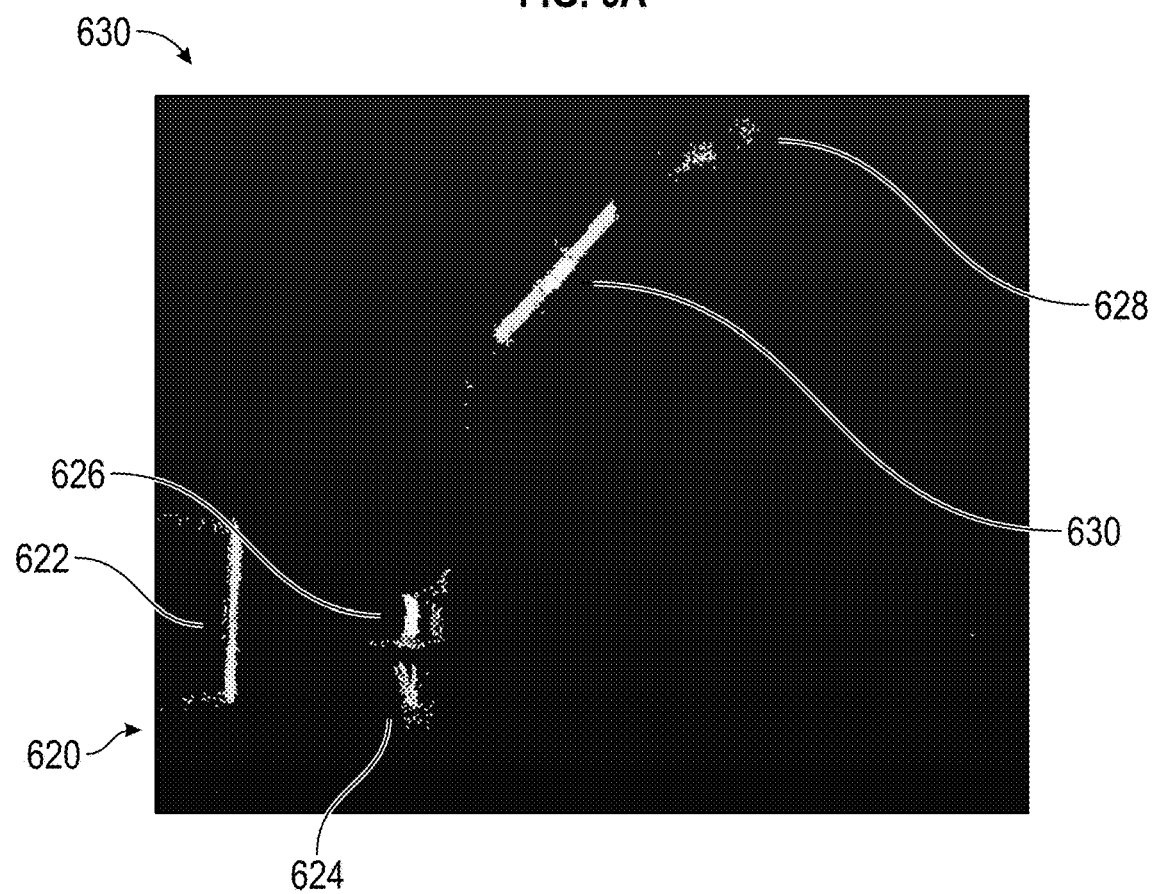

FIG. 6B may depict a second example point cloud 620 and a third example point cloud 630 generated for two different test targets. For example, the point cloud 620 may correspond to test target 403 and point cloud 630 may correspond to test target 404 depicted in FIG. 4C. The point clouds 620 and 630 shown in FIG. 6B may depict point clouds of the test targets from a top-down perspective. For example, point cloud 620 may depict a first set of points 622 that may be representative of a backboard of the test target 403. The point cloud 620 may also include a second set of points 626 representative of a retroreflector of the test target 403. Finally, the point cloud 620 may include a third set of points 624. The third set of points 624 may be invalid points in the point cloud 620. Specifically, the third set of points 624 may be invalid lateral ghost points, which may be invalid points that exist laterally to valid points representative of the actual retroreflector of the test target 403. Similarly, point cloud 630 may depict a fourth set of points 628, which may be invalid lateral ghost points in the point cloud 630 for the test target 404. The fifth set of points 630 may represent valid points in the point cloud that may represent the actual location of the retroreflector on the test target 404.

Figure 6C:
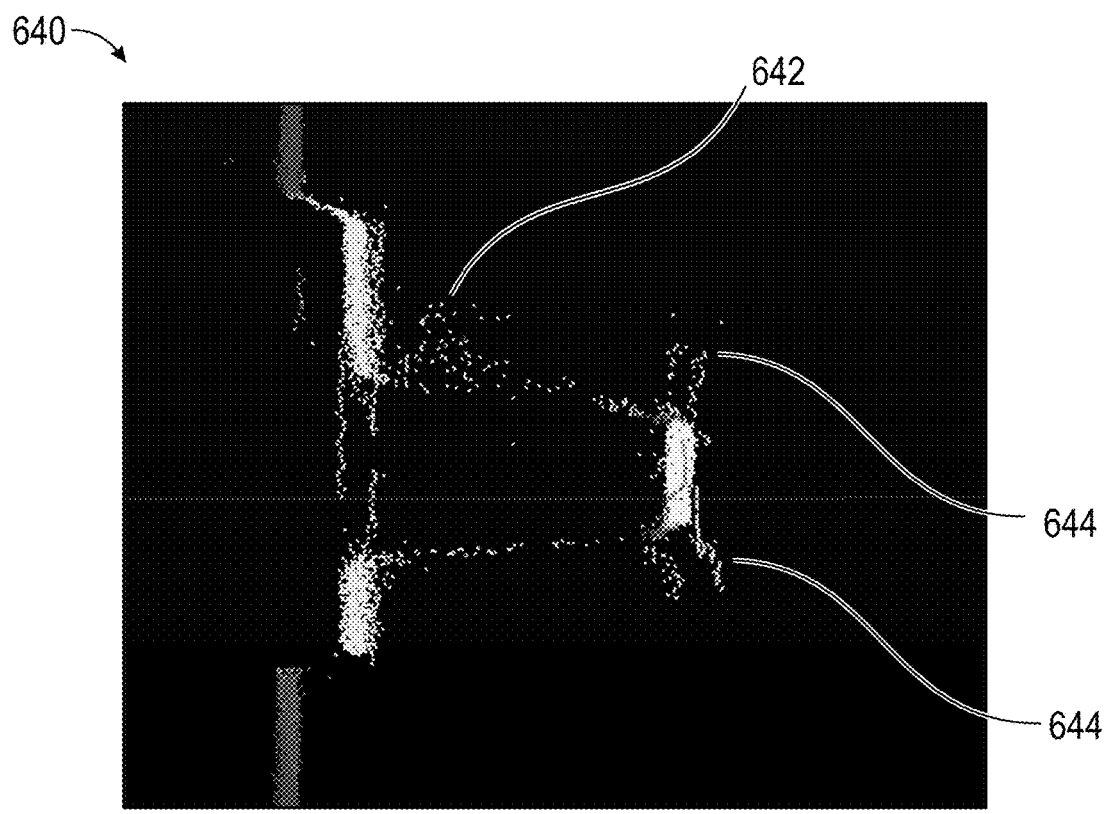
Figure 6D:
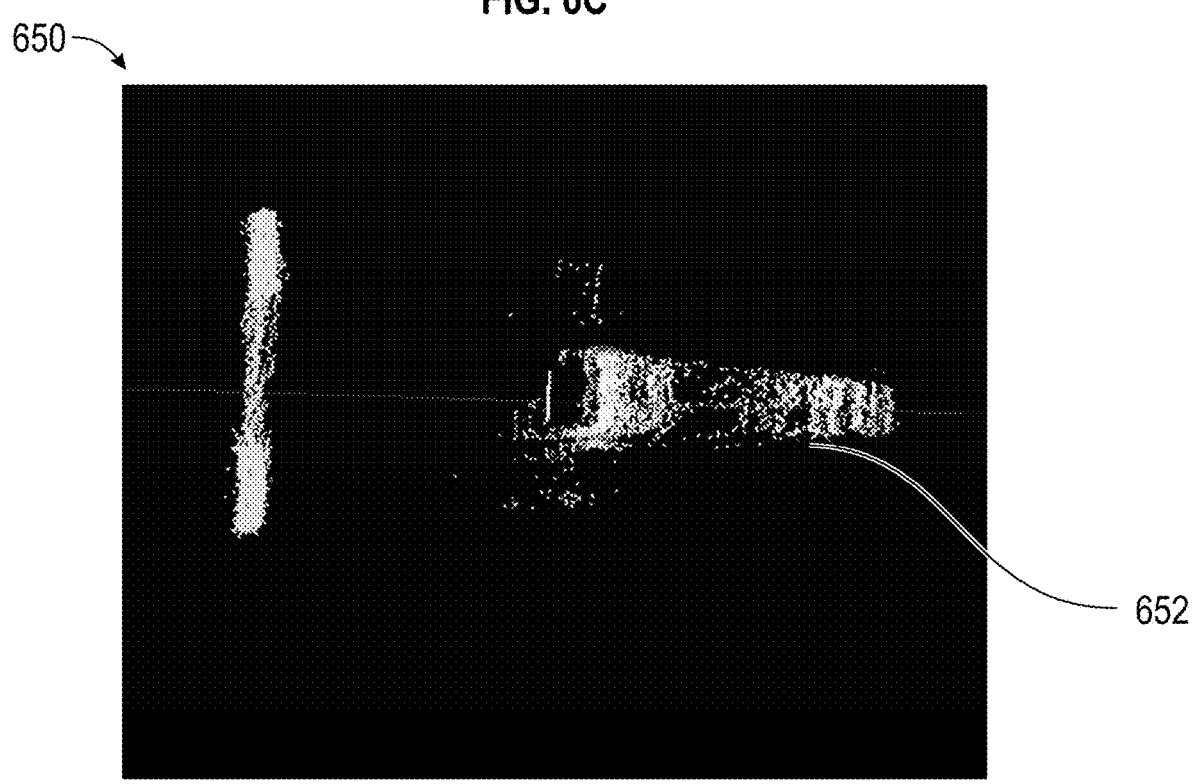

FIG. 6C may depict a fourth example point cloud 640. The point cloud 640 may be a point cloud that is representative of a top-down view of a test target with a retroreflector displaced from a backboard (for example, test target 403). FIG. 6C may depict a first set of invalid points 642 indicative of range resolution error, and a second set of invalid points 644 indicative of lateral flare. Finally, FIG. 6D may depict a fifth example point cloud 650, which may also be a point cloud that is representative of a top-down view of a test target with a retroreflector displaced from a backboard (for example, test target 403). The point cloud 650 may exemplify significant radial flare 652

Figure 7:
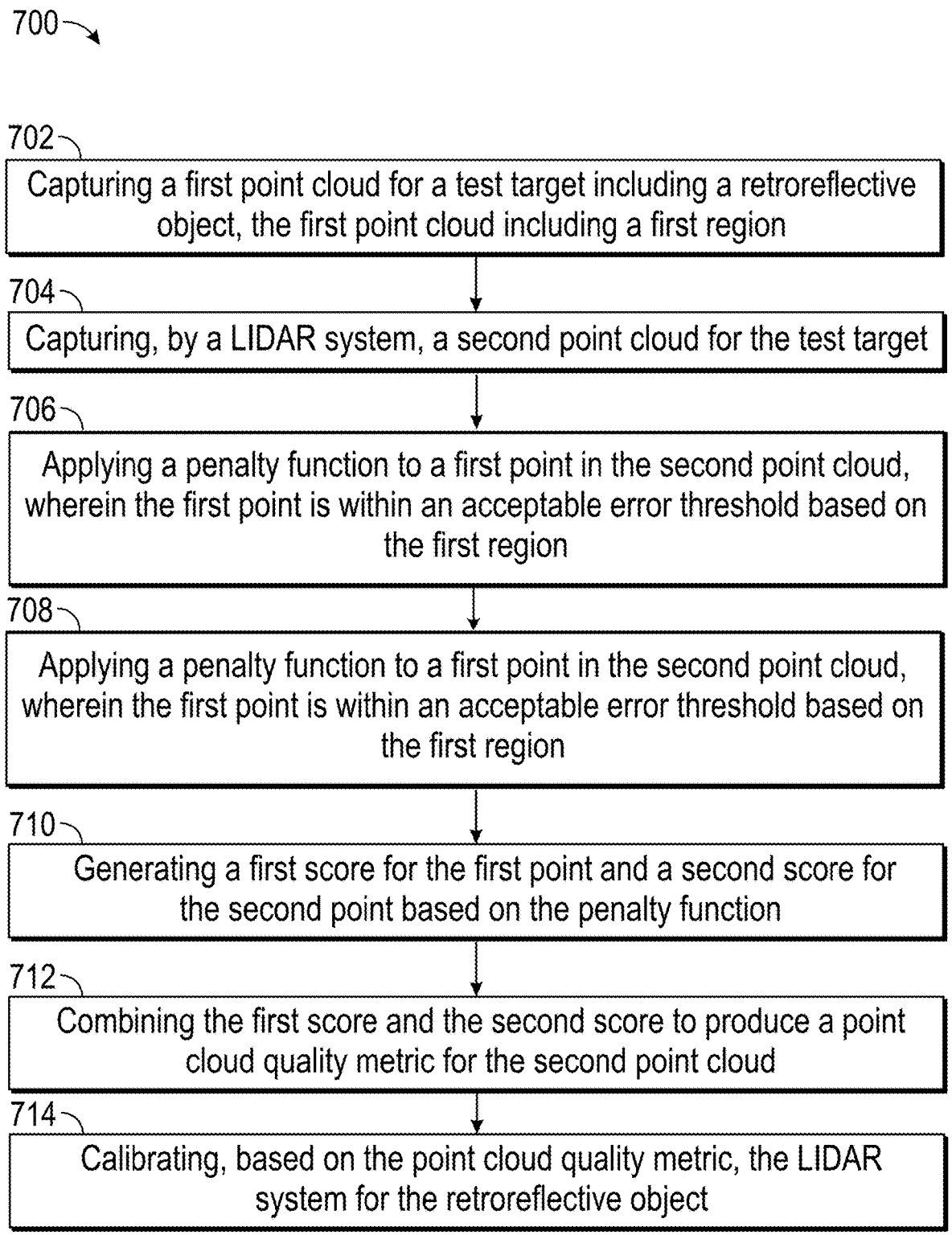
FIG. 7 depicts an example method, in accordance with one or more example embodiments of the disclosure.

FIG. 7 is an example method 700. At operation 702 of the method 700 in FIG. 7, the method 700 may include capturing a first point cloud for a test target including a retroreflective object, the first point cloud including a first region. Operation 704 of the method 700 may include capturing, by a LIDAR system, a second point cloud for the test target. Operation 706 of the method 700 may include applying a penalty function to a first point in the second point cloud, wherein the first point is within an acceptable error threshold based on the first region. Operation 708 of the method 700 may include applying a penalty function to a second point in the second point cloud, wherein the second point is outside of the acceptable error threshold based on the first region. Operation 710 of the method 700 may include generating a first score for the first point and a second score for the second point based on the penalty function. Operation 712 of the method 700 may include combining the first score and the second score to produce a point cloud quality metric for the second point cloud. Operation 714 of the method 700 may include calibrating, based on the point cloud quality metric, the LIDAR system for the retroreflective object.

In some embodiments, the method 700 may further include identifying a third point in the second point cloud that is also outside of the acceptable error threshold, wherein the third point is further outside the acceptable error threshold than the second point. The method 700 may further include applying the penalty function to the third point. The method 700 may further include generating a third score for the third point based on the penalty function, wherein the third score is greater than the second score for the second point. capturing, by a second LIDAR system, a third point cloud for the test target. The method 700 may further include comparing the third point cloud to the first point cloud. The method 700 may further include identifying a third point in the third point cloud that is within an acceptable error threshold based on the comparison. The method 700 may further include identifying a fourth point in the third point cloud that is outside of the acceptable error threshold based on the comparison. The method 700 may further include applying a penalty function to the third point and the fourth point. The method 700 may further include generating a third score for the third point and a fourth score for the fourth point based on the penalty function. The method 700 may further include aggregating the third score and the fourth score to produce a second point cloud quality metric for the third point cloud. The method 700 may further include calibrating, based on the second point cloud quality metric, the second LIDAR system for the retroreflective object, wherein the calibrating for the second LIDAR system is different than the calibrating for the LIDAR system.

In some embodiments, the first score is a zero value and the second score may be a nonzero value. In some embodiments, the second point is an invalid point in point cloud that is laterally or radially displaced from the acceptable error threshold for the second point cloud. In some embodiments, the acceptable error threshold for the second point cloud represents a threshold distance from a center point of the point cloud. In some embodiments, capturing the first point cloud is performed using a reference LIDAR system, a theodolite, or a laser range finder, the reference LIDAR system being different than the LIDAR system. In some embodiments, the test target also includes a first backing behind a second backing, the first backing being a white backing and the second backing being a black backing, the second backing being behind the retroreflective object, and wherein capturing the second point cloud comprises transitioning a direction of the LIDAR system from the first backing, to the second backing, and then to the retroreflective object. In some embodiments, the retroreflective object is displaced from the second backing by a given distance. In some embodiments, the retroreflective object is located on the second backing.

The operations described and depicted in the illustrative process flow of FIG. 7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 7 may be performed.

Figure 8:
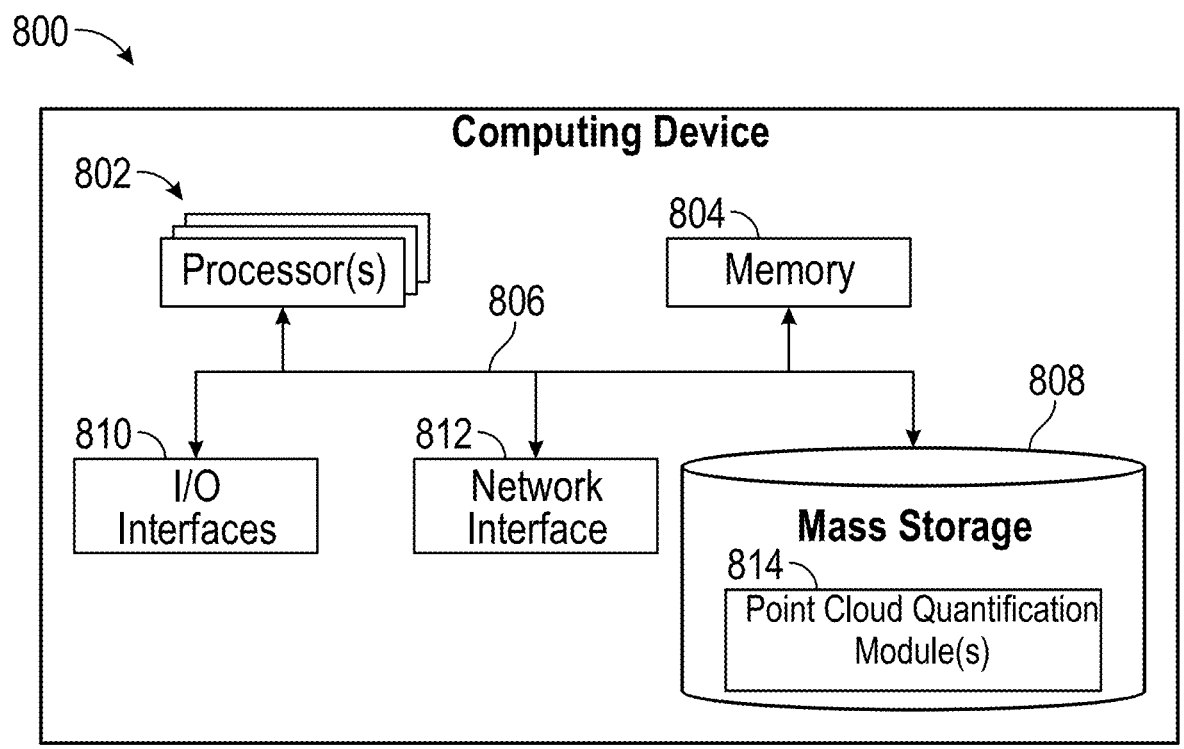
FIG. 8 depicts a schematic illustration of an example computing device architecture, in accordance with one or more example embodiments of the disclosure.

FIG. 8 illustrates an example computing device 800, in accordance with one or more embodiments of this disclosure. The computing 800 device may be representative of any number of elements described herein, such as the computing system 140. The computing device 800 may include at least one processor 802 that executes instructions that are stored in one or more memory devices (referred to as memory 804). The instructions can be, for instance, instructions for implementing functionality described as being carried out by one or more modules and systems disclosed above or instructions for implementing one or more of the methods disclosed above. The processor(s) 802 can be embodied in, for example, a CPU, multiple CPUs, a GPU, multiple GPUs, a TPU, multiple TPUs, a multi-core processor, a combination thereof, and the like. In some embodiments, the processor(s) 802 can be arranged in a single processing device. In other embodiments, the processor(s) 802 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 802 can access the memory 804 by means of a communication architecture 806 (e.g., a system bus). The communication architecture 806 may be suitable for the particular arrangement (localized or distributed) and type of the processor(s) 802. In some embodiments, the communication architecture 806 can include one or many bus architectures, such as a memory bus or a memory controller; a peripheral bus; an accelerated graphics port; a processor or local bus; a combination thereof, or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 804 also can retain data.

Each computing device 800 also can include mass storage 808 that is accessible by the processor(s) 802 by means of the communication architecture 806. The mass storage 808 can include machine-accessible instructions (e.g., computer-readable instructions and/or computer-executable instructions). In some embodiments, the machine-accessible instructions may be encoded in the mass storage 808 and can be arranged in components that can be built (e.g., linked and compiled) and retained in computer-executable form in the mass storage 808 or in one or more other machine-accessible non-transitory storage media included in the computing device 800. Such components can embody, or can constitute, one or many of the various modules disclosed herein. Such modules are illustrated as point cloud quantification modules 814. In some instances, the modules may also be included within the memory 804 as well.

Execution of the point cloud quantification modules 814, individually or in combination, by at least one of the processor(s) 802, can cause the computing device 800 to perform any of the operations described herein (for example, the operations described with respect to FIG. 3, as well as any other operations).

Each computing device 800 also can include one or more input/output interface devices 810 (referred to as I/O interface 810) that can permit or otherwise facilitate external devices to communicate with the computing device 800. For instance, the I/O interface 810 may be used to receive and send data and/or instructions from and to an external computing device.

The computing device 800 also includes one or more network interface devices 812 (referred to as network interface(s) 812) that can permit or otherwise facilitate functionally coupling the computing device 800 with one or more external devices. Functionally coupling the computing device 800 to an external device can include establishing a wireline connection or a wireless connection between the computing device 800 and the external device. The network interface devices 812 can include one or many antennas and a communication processing device that can permit wireless communication between the computing device 800 and another external device. For example, between a vehicle and a smart infrastructure system, between two smart infrastructure systems, etc. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like. The communication processing device can also process data according to other protocols as well, such as vehicle-to-infrastructure (V2I) communications, vehicle-to-vehicle (V2V) communications, and the like. The network interface(s) 512 may also be used to facilitate peer-to-peer ad-hoc network connections as described herein.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still, in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

That which is claimed is:

1. A method comprising:
    capturing a first point cloud for a test target including a retroreflective object, the first point cloud including a first region;
    capturing, by a LIDAR system, a second point cloud for the test target;
    applying a penalty function to a first point in the second point cloud, wherein the first point is within an acceptable error threshold based on the first region;
    applying the penalty function to a second point in the second point cloud, wherein the second point is outside of the acceptable error threshold based on the first region;
    generating a first score for the first point and a second score for the second point based on the penalty function;
    combining the first score and the second score to produce a point cloud quality metric for the second point cloud; and
    calibrating, based on the point cloud quality metric, the LIDAR system for the retroreflective object.

2. The method of claim 1, wherein the first score is a zero value and the second score is a nonzero value.

3. The method of claim 1, further comprising:
    identifying a third point in the second point cloud that is also outside of the acceptable error threshold, wherein the third point is further outside the acceptable error threshold than the second point;
    applying the penalty function to the third point; and
    generating a third score for the third point based on the penalty function, wherein the third score is greater than the second score for the second point.

4. The method of claim 1, wherein the second point is an invalid point in point cloud that is laterally or radially displaced from the acceptable error threshold for the second point cloud.

5. The method of claim 1, wherein the acceptable error threshold for the second point cloud represents a threshold distance from a center point of the point cloud.

6. The method of claim 1, wherein capturing the first point cloud is performed using a reference LIDAR system, a theodolite, or a laser range finder, the reference LIDAR system being different than the LIDAR system.

7. The method of claim 1, wherein the test target also includes a first backing behind a second backing, the first backing being a white backing and the second backing being a black backing, the second backing being behind the retroreflective object, and wherein capturing the second point cloud comprises transitioning a direction of the LIDAR system from the first backing, to the second backing, and then to the retroreflective object.

8. The method of claim 7, wherein the retroreflective object is displaced from the second backing by a given distance.

9. The method of claim 7, wherein the retroreflective object is located on the second backing.

10. The method of claim 1, further comprising:
    capturing, by a second LIDAR system, a third point cloud for the test target;
    comparing the third point cloud to the first point cloud;
    identifying a third point in the third point cloud that is within the acceptable error threshold;
    identifying a fourth point in the third point cloud that is outside of the acceptable error threshold;
    applying the penalty function to the third point and the fourth point;
    generating a third score for the third point and a fourth score for the fourth point based on the penalty function;
    aggregating the third score and the fourth score to produce a second point cloud quality metric for the third point cloud; and
    calibrating, based on the second point cloud quality metric, the second LIDAR system for the retroreflective object, wherein the calibrating for the second LIDAR system is different than the calibrating for the LIDAR system.

11. A system comprising:
a processor; and
a memory storing computer-executable instructions, that when executed by the processor, cause the processor to:
  capture a first point cloud for a test target including a retroreflective object, the first point cloud including a first region;
  capture, by a LIDAR system, a second point cloud for the test target;
  apply a penalty function to a first point in the second point cloud, wherein the first point is within an acceptable error threshold based on the first region;
  apply the penalty function to a second point in the second point cloud, wherein the second point is outside of the acceptable error threshold based on the first region;
  generate a first score for the first point and a second score for the second point based on the penalty function;
  combine the first score and the second score to produce a point cloud quality metric for the second point cloud; and
  calibrating, based on the point cloud quality metric, the LIDAR system for the retroreflective object.

12. The system of claim 11, wherein the first score is a zero value and the second score is a nonzero value.

13. The system of claim 11, wherein the computer-executable instructions further cause the processor to:
  identify a third point in the second point cloud that is also outside of the acceptable error threshold, wherein the third point is further outside the acceptable error threshold than the second point;
  apply the penalty function to the third point; and
  generate a third score for the third point based on the penalty function, wherein the third score is greater than the second score for the second point.

14. The system of claim 11, wherein the second point is an invalid point in point cloud that is laterally or radially displaced from the acceptable error threshold for the second point cloud.

15. The system of claim 11, wherein the acceptable error threshold for the second point cloud represents a threshold distance from a center point of the point cloud.

16. The system of claim 11, wherein capture the first point cloud is performed using a reference LIDAR system, a theodolite, or a laser range finder, the reference LIDAR system being different than the LIDAR system.

17. The system of claim 11, wherein the test target also includes a first backing behind a second backing, the first backing being a white backing and the second backing being a black backing, the second backing being behind the retroreflective object, and wherein capture the second point cloud comprises transitioning a direction of the LIDAR system from the first backing, to the second backing, and then to the retroreflective object.

18. The system of claim 17, wherein the retroreflective object is displaced from the second backing by a given distance.

19. The system of claim 17, wherein the retroreflective object is located on the second backing.

20. The system of claim 11, wherein the computer-executable instructions further cause the processor to:
  capture, by a second LIDAR system, a third point cloud for the test target;
  compare the third point cloud to the first point cloud;
  identify a third point in the third point cloud that is within the acceptable error threshold;
  identify a fourth point in the third point cloud that is outside of the acceptable error threshold;
  apply the penalty function to the third point and the fourth point; and
  generate a third score for the third point and a fourth score for the fourth point based on the penalty function.

* * * * *